(12) United States Patent
Miura et al.

(10) Patent No.: US 7,343,223 B2
(45) Date of Patent: Mar. 11, 2008

(54) ROBOT APPARATUS AND LOAD SENSOR

(75) Inventors: Akito Miura, Miyagi (JP); Ryoichi Maeda, Miyagi (JP); Susumu Tosaka, Tokyo (JP); Takeshi Igarashi, Kanagawa (JP); Goushi Koike, Tokyo (JP)

(73) Assignees: Alps Electric Co., Ltd., Tokyo (JP); Sony Corporation, Tokyo (JP)

( * ) Notice: Subject to any disclaimer, the term of this patent is extended or adjusted under 35 U.S.C. 154(b) by 710 days.

(21) Appl. No.: 10/796,940

(22) Filed: Mar. 10, 2004

(65) Prior Publication Data
US 2004/0181312 A1 Sep. 16, 2004

(30) Foreign Application Priority Data
Mar. 13, 2003 (JP) ............................ P2003-067769
Mar. 14, 2003 (JP) ............................ P2003-070721

(51) Int. Cl.
*G05B 13/00* (2006.01)

(52) U.S. Cl. ...................... 700/258; 700/245; 700/260; 318/568.12; 318/568.16; 901/34; 901/46

(58) Field of Classification Search ................ 700/258, 700/245, 260; 318/568.12, 568.16; 901/34, 901/46
See application file for complete search history.

(56) References Cited

U.S. PATENT DOCUMENTS 6,832,132 B2 * 12/2004 Ishida et al. ................ 700/245
6,963,185 B2 * 11/2005 Takenaka et al. ...... 318/568.12

* cited by examiner

*Primary Examiner*—Thomas Black
*Assistant Examiner*—Marie A Weiskopf
(74) *Attorney, Agent, or Firm*—Frommer Lawrence & Haug LLP; William S. Frommer; Thomas F. Presson

(57) ABSTRACT

A load sensor that is inoperable even when applied with a large load, has a simple structure easily designed to be lightweight and compact and can detect a load with a high accuracy, and a legged robot apparatus including the load sensor in each of legs thereof. The robot apparatus includes the load sensors counting more than one and each of which detects, as an external force, a reaction applied when the leg abuts a ground surface. The load sensor includes a diaphragm, an activating member that is applied with an external force, a driving member forming along with the activating member a double structure and which presses the pressure-sensitive portion, and an elastic member.

14 Claims, 12 Drawing Sheets

ROBOT APPARATUS AND LOAD SENSOR

BACKGROUND OF THE INVENTION

1. Title of the Invention

The present invention relates to a load sensor that detects a load in response to an applied pressure ranging up to a predetermined load, and a robot apparatus having the load sensor provided at each of leg portions thereof, for example.

This application claims the priority of the Japanese Patent Application No. 2003-070721 filed on Mar. 14, 2003 and No. 2003-067769 filed on Mar. 13, 2003, the entirety of which is incorporated by reference herein.

2. Description of the Related Art

Recently, the research and development on legged robot apparatuses modeled on bipedal animals walking in erect posture such as the human being, monkey or the like have made remarkable advance, and the demand for practical applications of such robot apparatuses has become larger and larger. In the meantime, the bipedal robot apparatuses walking in erect posture are not so stable as a crawler-, quadruped- and hexapod-type ones and control of their posture and walking needs a complicated mechanism. However, they are excellent in smooth and flexible motion on a rough terrain or an obstacle, irregular surface of a work route in a construction site or the like, discontinuous walking surfaces of a stair or ladder, etc.

Most of the working and living spaces are tailored to the physical mechanism and behavior of the human being walking in erect posture on two feet. In other words, the space where the human being is living includes too many barriers against the current mechanical system using wheels and other drive units as a moving means. To make various jobs in support, or on behalf, of the human being and to be further accepted in the daily life of the human being, the mechanical system, or the robot apparatus, should desirably be able to move in a range nearly equal to the moving range of the human being. This is the reason for the large demand for the practical applications of the legged robot apparatuses. Being of a humanoid type is essential for the robot apparatus to have a higher affinity to the residential environment of the human being.

There have been proposed many techniques for posture control and stable walking of legged robot apparatuses of a bipedal walking type. Most of them adopts the ZMP (zero moment point) criterion for determination of the walking stability. This ZMP criterion is based on the d'Alembert's principle. This d'Alembert's principle is such that a weight and inertial force and their moment from a walking system will act on a road surface and a floor reaction force and floor reaction moment as reactions of the road surface on the walking system will balance with each other. It is inferred by the dynamics that there exists on or inside sides of a supporting polygon defined by the grounding point of a foot bottom (sole portion) and the road surface a point where the pitch-axis and roll-axis moments (floor reaction moment during walking) are zero. This point is called "ZMP". Also, the ZMP trajectory is an orbit depicted by ZMP while a robot apparatus is walking, for example.

Control of bipedal walking on the basis of the ZMP criterion is advantageous in that a grounding point of the sole portion can be determined in advance and the kinematic constraint of the foot toe corresponding to the shape of a road surface can easily be considered. Also, since taking ZMP as the criterion for determination of the walking stability means taking an orbit, not any force, as the target value of an action control, the technical feasibility of the walking control can be improved. The above concept of ZMP and employment of ZMP as the criterion for determination of the walking stability a bipedal walking robot apparatus are referred to in the "Legged Locomotion Robots" by Miomir Vukobratovic.

For controlling the action of the robot apparatus using ZMP as the criterion for determination of the walking stability, measurement of an actual ZMP is very useful. On this account, a plurality of ZMP detecting sensors including a load sensor, acceleration sensor, etc. is disposed at a foot provided at the end of each moving leg of the robot apparatus (also see the Japanese Published Unexampled Application No. 1995-280671). A value detected by each of these sensors is converted from analog to digital, and the digital signal is supplied to a main controller provided in the body of the robot apparatus. The main controller calculates an actual ZMP on the basis of such detected values, and uses the calculation results for controlling each of actions including the walking of the robot apparatus.

Some of the conventional bipedal walking robot apparatuses use a double-structure foot formed from an instep member and a sole member installed to the instep member to be freely movable. The double-structure foot has many advantages in that the sole member can be changed correspondingly to the shape of a road surface and also replaced when it has been worn out by abrasion, and the leg and foot sole can be manufactured separately, for example. In this case, the ZMP detecting sensors are disposed between the instep and sole members. In case the ZMP detecting sensors (load sensor) are provided as above, however, when the robot apparatus walks on the aforementioned discontinuous walking surfaces, the sole member will bend or be otherwise deformed so that the load sensor will be applied with an extremely large load, thus be deteriorated in accuracy of detection or broken. Therefore, the sole member of the robot apparatus using such a double-structure foot has a stopper function incorporated in the whole foot, especially, in an exterior member of the foot, to prevent a large load from being applied to the load sensor.

However, since a plurality of load sensors has to be provided in the aforementioned double-structure foot, in case the stopper function corresponding to each load sensor is to be provided in the exterior member of the foot, the positioning accuracy of the load sensors should usually be in the order of tens micrometers (μm) and the stopper function has to be adjusted for all the load sensors. Namely, the requirement for the dimensional accuracy makes it extremely difficult to manufacture a robot apparatus using such double-structure feet. Thus, it becomes necessary to develop a foot structure having a stopper function incorporated in other than the sole member of the robot apparatus.

On the other hand, there has been proposed a load sensor that detects a load applied from above or below and has provided therein a mechanical stopper to prevent a diaphragm inside the load sensor from being broken by an excessive or impact load. The load sensor is schematically illustrated in FIG. 1. As shown, the load sensor includes a diaphragm 411 whose central portion is formed as a thin pressure-sensitive portion 411a on which strain gauges are provided, a rubber-made driving member 417 provided on the pressure-sensitive portion 411a, and an activating member 414 surrounding the driving member 417.

The activating member 414 is formed for a gap to occur between itself and the diagram 411 when it is applied with no load. When a load is applied to the activating member 414, a strain develops in the pressure-sensitive portion 411a of the diaphragm 411 via the driving member 417 and the load is thus detected by the strain gauges. When a larger load than a predetermined one is applied to the activating member 414, the latter will abut, at the bottom thereof, a thick portion 411b of the diaphragm 411 and prevent the pressure-sensitive portion 411a from being applied with any larger load. Thus, it is possible to protect the pressure-sensitive portion 411a against an excessive or impact load.

However, use of the above-mentioned load sensor in the foot of a robot apparatus will lead to the following problem. That is, since the aforementioned conventional load sensor has the rubber-made driving member provided between the activating member and diaphragm, the dimensional accuracy of the rubber and change of the ambient temperature will cause the load detection to vary from one sensor to another. Namely, the conventional load sensor cannot detect a load with a high accuracy. More particularly, although the load sensor is designed for the activating member to abut the diaphragm when applied with a predetermined load, a variation, if any, caused by the above factors will lead to a variation of the load under which the activating member is to abut with the diaphragm. The rubber will hardly displace linearly in response to any load applied. It will displace largely under a small load and will little displace under a certain magnitude of load. Therefore, the pressure-sensitive portion of the diaphragm is applied with a very large load even when the driving member slightly varies in characteristic, which is likely to cause the diaphragm to be broken in some cases. For calculation of ZMP in the robot apparatus, all the load sensors provided in the foot should be able to detect a load with a high accuracy. With the rubber-made driving member, however, it is extremely difficult to detect a load stably even with a large variation of the environmental condition.

As will be known from the above, the stopper provided in other than the exterior member of the foot allows an easy positioning, and it is necessary to develop a foot structure having provided therein load sensors whose load detection will not vary from one sensor to another.

OBJECT AND SUMMARY OF THE INVENTION

It is therefore an object of the present invention to overcome the above-mentioned drawbacks of the related art by providing a load sensor that will not be broken even when applied with a large load, has a simple structure, is easy to be designed lightweight and compact and can detect a load with a high accuracy, and a legged robot apparatus having the load sensor provided in each leg.

The above object can be attained by providing a robot apparatus having movable parts, the apparatus including according to the present invention:

a moving means for moving the robot apparatus; and more than one load sensor that detects, as an external force, a reaction applied when the moving means contacts a ground surface, and the load sensor that includes a pressure detecting means having a pressure-sensitive portion that converts a pressure into an electrical signal, a pressing member which is deformed correspondingly to the magnitude of the external force and presses the pressure detecting means, and a stopper function to limit the external force so that the pressure to the pressure-sensitive portion of the pressure detecting means is smaller than a predetermined threshold.

In the above robot apparatus according to the present invention, since the pressing member having a stopper function to limit the external force to below the predetermined threshold, to thereby making the external force smaller than the predetermined threshold, so the detecting accuracy of the load sensor can be maintained by preventing the pressure detecting means of the load sensor provided in the moving means from incurring a permanent deformation or being broken, for example, when the robot apparatus moves. Also, since the pressure detecting means is pressed by the pressing member that is deformed correspondingly to the magnitude of the external force, it is possible to detect the external force with an extremely high accuracy and stability.

Also, the moving means is the leg of the robot apparatus in practice, and the leg can have provided therein more than one load sensor that detects, as an external force, a reaction applied when the leg contacts the ground surface. Even if the foot sole is bend and thus a large external force is applied to the load sensors when the robot apparatus walks on discontinuous road surfaces, the load sensors will not be broken.

Further, the moving means may include an instep member, a sole member installed to the instep member to be freely movable, and more than one load sensors provided on one of the instep or sole member. Thus, when the sole member is not in contact with the ground surface or road surface, a reaction applied when the load sensors abut the ground surface can be detected as an external force with either the sole member or instep member on which the load sensors are not provided and the load sensors being isolated from each other (with the leg in idling state or not in preloaded state). Therefore, each load sensor has not to be calibrated (zero adjustment). Also, since the load sensor incorporates a stopper function to the external force, it is not necessary to provide outside the load sensor any stopper function that limits the external force, for example. Further, since the foot is formed to have such a double structure, it is replaceable when the foot sole is to be changed correspondingly to a road surface or when it has been worn out by abrasion, and the leg and foot sole can be manufactured separately.

Also the above object can be attained by providing a load sensor including a plate-shaped pressure detecting means having a thin pressure-sensitive portion formed in the center thereof and strain gauges installed on the pressure-sensitive portion and a driving member mounted on the pressure-sensitive portion and which is pressed by a load-applying activating member, the load sensor including an elastic member that couples the driving member and activating member to each other and displaces linearly in response to a load applied, the activating member pressing the driving member to the pressure-sensitive portion via the elastic member and being made to abut the pressure detecting means when a predetermined load is applied.

In the above load sensor according to the present invention, the activating member and driving member are coupled to each other via the elastic member that displaces linearly in response to a load applied and the activating member presses the driving member to the pressure-sensitive portion via the elastic member. So, the load sensor can detect a load in a stable manner, and the load that activates the mechanical stopper can be made generally constant, not depending upon any environmental condition.

Also, the pressure detecting means may be formed thick around the pressure-sensitive portion so that the activating member abuts the thick portion. Thus, an excessive or impact load from the activating member can be received by the thick portion.

Further, there may be defined between the activating member and thick portion a gap smaller than the critical linear displacement the elastic member attains in response to a load applied. In case the gap between the activating member and pressure detecting means is made smaller than the critical displacement of the elastic member to define a range of linear displacement of the elastic member, the driving member can be made to abut the pressure detecting means always under a constant load.

Furthermore, the driving member may have a flange portion that abuts the pressure-sensitive portion, the activating member may have a step portion that presses the driving member, and the elastic member may be a belleville spring (coned disk spring) that is engaged on each of the flange and step portion to couple the driving and activating members to each other. By using a belleville spring as the elastic member as above, it is possible to displace the elastic member linearly even when the length of the elastic member in which it displaces is reduced.

As above, in the robot apparatus according to the present invention, the load sensor including the pressing member incorporating the stopper function and which displaces in proportion to the magnitude of an external force is provided in each of the moving means of the robot apparatus, especially, in the moving foot. The pressing member prevents the pressure detecting means of the load sensor from incurring a permanent deformation or being broken, for example, and maintains the accuracy of external force detection by pressing the pressure detecting means correspondingly to the magnitude of an external force. Thus, according to the present invention, the robot apparatus can be designed lightweight and compact and manufactured at a low cost, and also there can be provided a robot apparatus having a foot sole incorporating a ZMP measurement function and which is highly resistant against an impact.

In the load sensor according to the present invention, since the pressure detecting means can be pressed with a generally constant load by the pressing member whose stroke is generally proportional to a load applied, not depending upon any environmental condition, the load can be detected accurately. Also, the stopper function provided in the load sensor to limit a pressure to below a predetermined threshold can prevent the pressure detecting means from being broken by an excessive or impact load.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The present invention will be described in detail concerning the embodiments thereof with reference to the accompanying drawings. The following description will cover first the load sensor according to the present invention, and then the legged robot apparatus having feet each having the load sensor provided therein.

Figure 1:
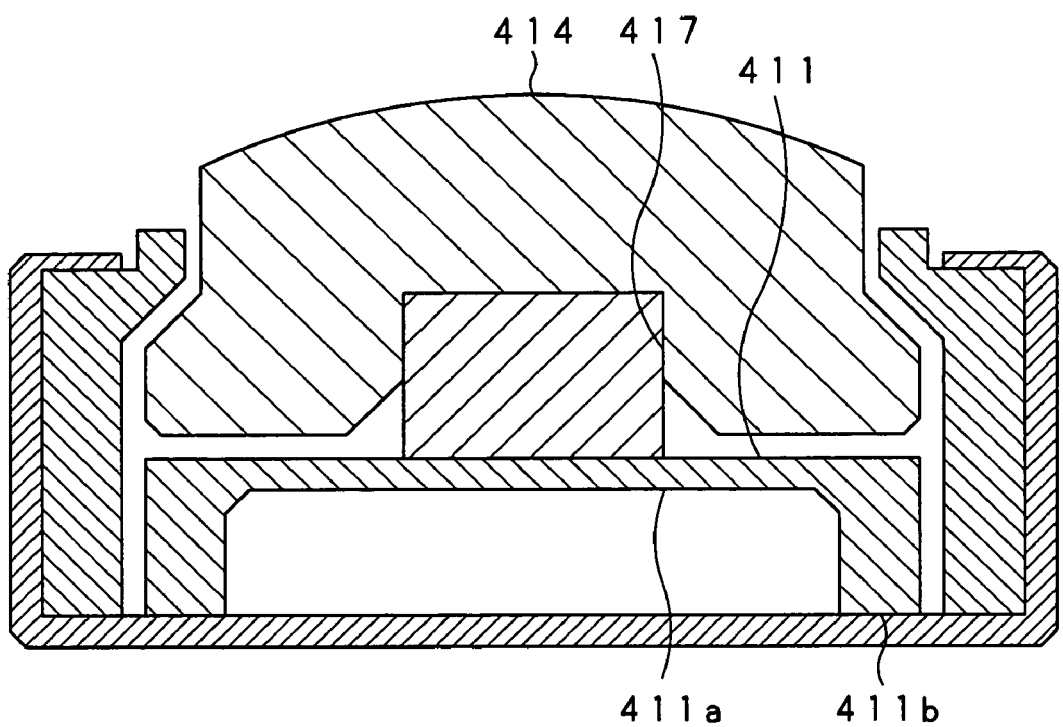
FIG. 1 is a longitudinal-sectional view of the conventional load sensor.
Figure 2:
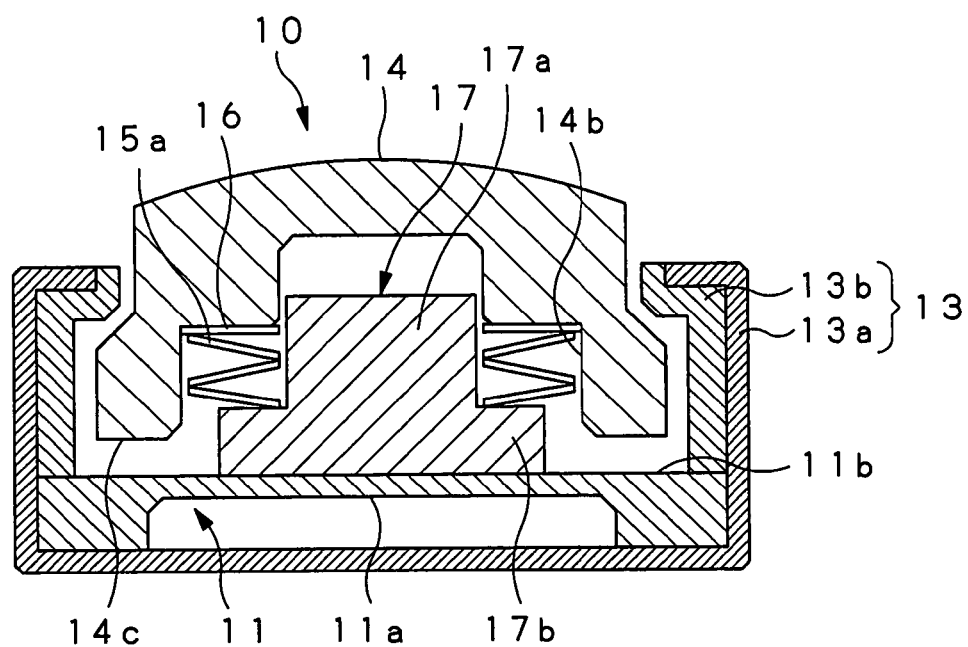
FIG. 2 is a longitudinal-sectional view of a load sensor according to the present invention.
Figure 3:
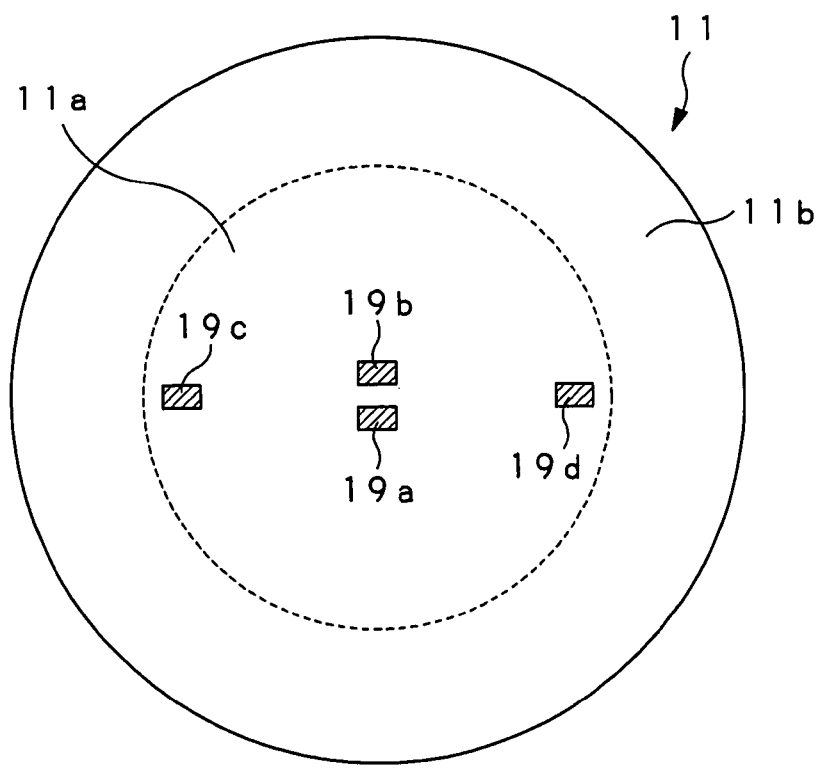
FIG. 3 is a plan view of a diaphragm used in the load sensor in FIG. 2.

FIG. 2 is a longitudinal-sectional view of the load sensor, generally indicated with a reference 10, according to the present invention, and FIG. 3 is a plan view of a diaphragm 11 as the pressure detecting means used in the load sensor 10 according to the present invention. According to the present invention, the diaphragm 11 included in the load sensor 10 has a central portion thereof formed thin as a pressure-sensitive portion 11a. The pressure-sensitive portion 11a has four strain gauges provided thereon, and there is mounted a driving member 17 on the upper surface of the pressure-sensitive portion 11a, coupled to an activating member 14 via an elastic member 15.

As shown in FIGS. 2 and 3, the diaphragm 11 is formed like a disk of which the central portion is formed thin for easy bending. The central thin portion of the diaphragm 11 has two strain gauges 19a and 19b provided near the center, and two strain gauges 19c and 19d provided near the periphery thereof. The two strain gauges 19c and 19d are disposed symmetrically across the strain gauges 19a and 19b positioned near the center. The central portion of the diaphragm 11, having the strain gauges 19a to 19d provided thereon as above, provides a pressure-sensitive portion 11a. It should be noted that the strain gauges 19a to 19d may not always be disposed as above but may be disposed in a rotational symmetry with respect to the center of the diaphragm.

When the pressure-sensitive portion 11a is applied with a load from above, a strain develops in the central portion of the pressure-sensitive portion 11a in a direction in which the diaphragm 11 is compressed, and a strain develops in the peripheral portion of the pressure-sensitive portion 11a in a direction in which the diaphragm 11 is pulled. Each of the strain gauges 19a to 19d is connected to a bridge circuit (not shown) to detect a load. The bridge circuit is similar to a conventional one. The diaphragm 11 is formed thick along the periphery thereof to provide a thick portion 11b. The thick portion 11b abuts at the bottom and side thereof a case assembly 13 to support the diaphragm 11 itself as shown in FIG. 2.

The driving member 17 is mounted on the pressure-sensitive portion 11a of the diaphragm 11. The driving member 17 is formed from a two-step cylinder made of a metallic material, for example, and which has a flange portion 17b that is a wide portion of the driving member 17, which abuts the pressure-sensitive portion 11a. To abut and press, at the bottom, the pressure-sensitive portion 11a of the diaphragm 11, the flange portion 17b is formed smaller in diameter at the bottom thereof than the pressure-sensitive portion 11a.

The driving member 17 is pressed by the activating member 14. The activating member 14 is made of a resin, for example, and formed wider than the driving member 17. Also, the activating member 14 has formed therein a cavity that can receive the driving member 17 nearly entirely. The cavity in the activating member 14 is formed like a two-step cylinder correspondingly to the flange portion 17b of the driving member 17, and it has thus a step portion 14b. Also, the activating member 14 has the upper surface thereof formed like a generally spherical one so that a load applied will be conveyed uniformly to the driving member 17.

The activating member 14 and driving member 17 are coupled by the elastic member 15 to each other. The elastic member 15 is formed from a belleville spring formed from elements 15a each made of a generally ring-like disk and that are stacked face to face one on the other obliquely from the inner to outer circumference. The belleville spring can have the height thereof limited in the direction of displacement to a relatively small one. Since the stroke of the belleville spring varies generally linearly starting with a small load even in this case, the space between the activating member 14 and driving member 17 may not be so large, which thus leads to a thinner design of the load sensor 10.

The elastic member 15 is provided in such a manner that it is engaged on each of the step portion 14b of the activating member 14 and flange portion 17b of the driving member 17 and surrounds a shaft portion 17a formed narrow above the flange portion 17b of the driving member 17. Also, a washer 16 is provided between the elastic member 15 and the step portion 14b of the activating member 14. If the washer 16 is not so provided, the activating member 14, if made of a resin, for example, will possibly be dented when applied locally with a load from the belleville spring. On this account, the washer 16 is provided to disperse the applied load at the step portion 14b, to thereby prevent the activating member 14 from being so dented. It should be noted that the activating member 14 may be formed from a metallic material.

The bottom of the activating member 14 is formed generally flat to provide an abutment surface 14c. Without any load being applied to the activating member 14, there is defined a gap between the abutment surface 14c and the diaphragm 11. A load applied to the activating member 14, which is smaller than a predetermined one, will press the driving member 17 via the elastic member 15. When the load reaches the predetermined one, the abutment surface 14c will abut and press the thin portion 11b of the diaphragm 11. Thus, no larger load will be applied to the driving member 17, so that the pressure-sensitive portion 11a of the diaphragm 11 can be prevented from being broken under an excessive or impact load.

Figure 5:
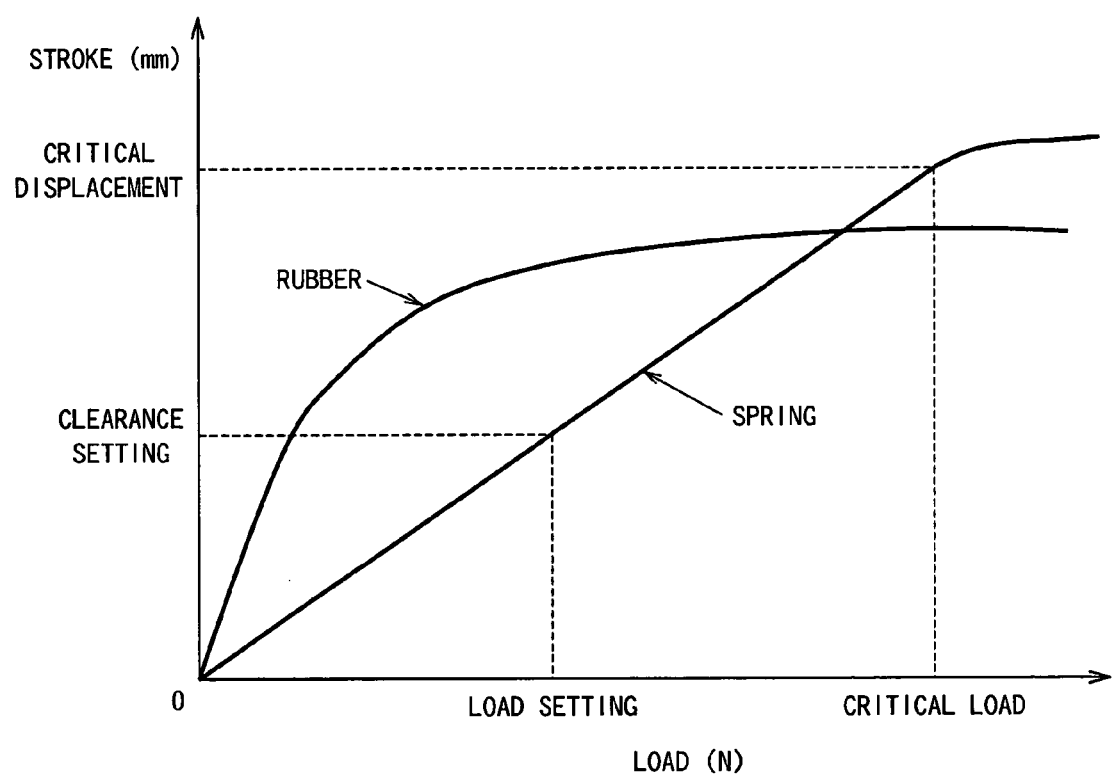
FIG. 5 schematically illustrates the strokes a rubber and belleville spring have, respectively, in response to a load applied.

By determining the gap between the abutment surface 14c of the activating member 14 and diaphragm 11 on the basis of a stroke the elastic member 15 makes in response to a load, the abutment surface 14c can be made to abut the diaphragm when a predetermined load is applied. FIG. 5 is a graph schematically illustrating the strokes the elastic member 15 has in response to a load applied. The horizontal axis of the graph indicates a load (N) and the vertical axis indicates a stroke (mm). As seen, since the belleville spring has a stroke proportional to a load applied, it is easy to determine a gap between the abutment surface 14c and diaphragm 11 in relation to a load set for an abutment between them.

However, when the load applied exceeds a certain one, no proportion will be established between the load and stroke. This load is called "critical load", and the stroke of the belleville spring under this "critical load" is called "critical displacement". Therefore, the load for abutment between the abutment surface 14c and diaphragm 11 is set smaller than the critical load of the belleville spring. That is, the gap setting should be smaller than the critical displacement.

Note that to use the load sensor incorporating the belleville spring, for example, in the robot apparatus, the stroke for a load setting of 5 kg ($\approx$50 N), for example, may be set to 0.45 mm or so. However, the relation between the load and stroke may not be defined by the "critical load" and "critical displacement" as in FIG. 5 but it varies depending upon the type of the spring used, mechanism, that is, number of belleville springs included, for example, and constant of the spring. Also, when a rubber is used, the relation can vary depending upon the material and ambient temperature.

FIG. 5 shows a stroke a belleville spring has in response to a load applied, and a stroke a rubber has in response to the load applied. As shown, the rubber has a stroke largely variable in response to a small load applied. Also, the rubber varies in hardness depending upon the ambient temperature, and a slight difference in hardness will cause an error in the load setting, which will cause the activating member 14 to work unsteadily. On the other hand, the belleville spring has a stroke varying generally proportional until the load reaches the critical one and varies little in characteristic depending upon the ambient temperature. Thus, the load sensor using the belleville spring can detect a load stably and cause the abutment surface 14c of the activating member 14 to abut the diaphragm 11 under a constant load.

Figure 4:
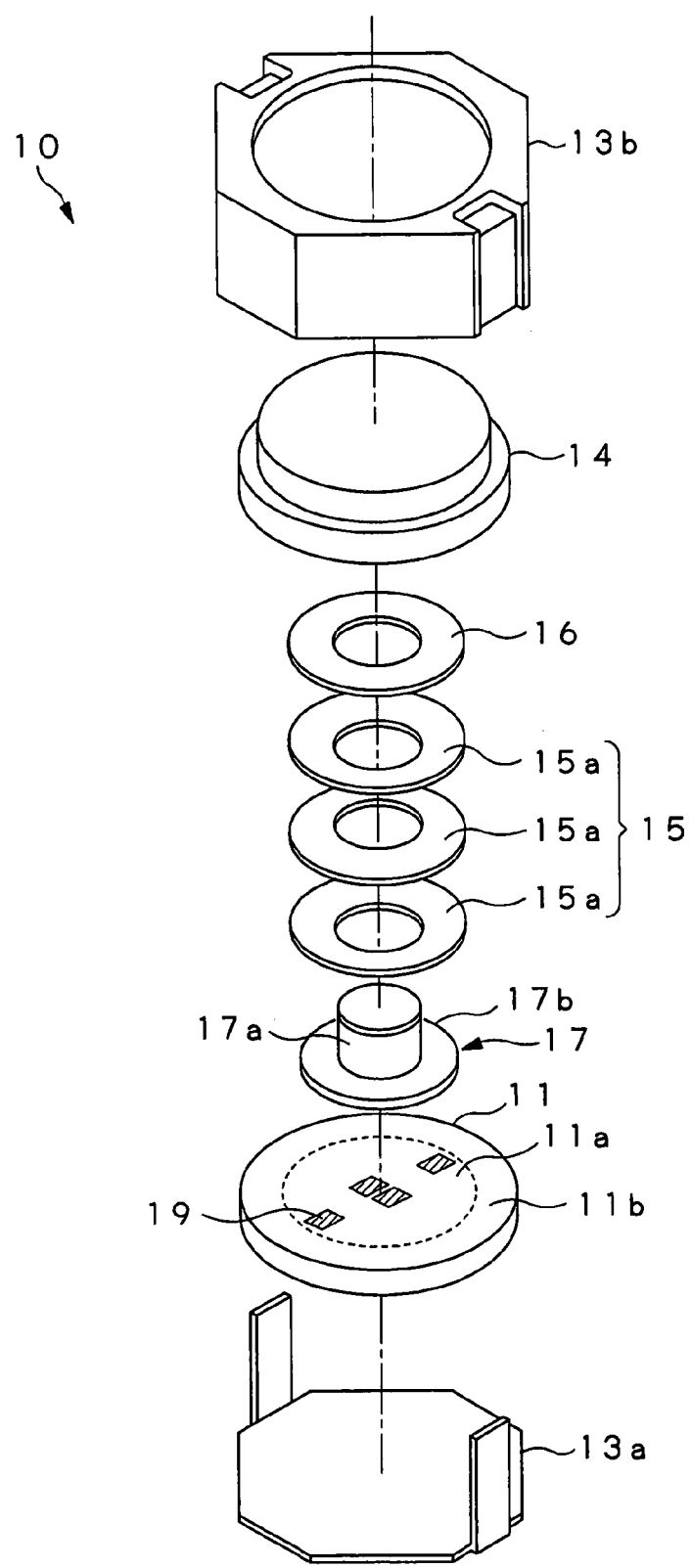
FIG. 4 is an assembly drawing of the load sensor in FIG. 2.

FIG. 4 is an exploded perspective view (assembly drawing) of the load sensor according to the present invention. As shown, the diaphragm 11, driving member 17, activating member 14 and elastic member 15, forming together the load sensor 10, are housed in the case assembly 13. The case assembly 13 is composed of a fixing plate portion 13a and cover portion 13b. The fixing plate portion 13a has the diaphragm 11 installed thereto. The thick portion 11b of the diaphragm 11 is mounted at the bottom thereof on the fixing plate portion 13a and supports a load from the activating member 14. The pressure-sensitive portion 11a of the diaphragm 11 has the strain gauges 19a to 19d provided thereon and the driving member 17 mounted on the pressure-sensitive portion 11a. The elastic member 15 being the belleville spring is engaged on the flange 17b, and the washer 16 is provided at the upper end of the elastic member 15.

Further, the activating member 14 is disposed to cover the driving member 17 and elastic member 15 generally as a whole, and has the step portion 14b thereof abut the washer 16. At this stage, the gap between the abutment surface 14c that is also the bottom of the activating member 14 and the diaphragm 11 is such that the abutment surface 14c will abut the diaphragm 11 when the aforementioned load is applied. The diaphragm 11 and activating member 14 are surrounded by the cover portion 13b that is fixed to the fixing plate portion 13a. The activating member 14 is formed so tall as to project at the top thereof from the top of the cover portion 13b with the cover portion 13b being fixed to the fixing plate portion 13a. Namely, the activating member 14 is thus applied with an external load.

The load sensor 10 constructed as above according to the present invention functions as will be described below:

When the activating member 14 is applied a load from outside, it will press the driving member 17 via the elastic member 15 and the driving member 17 press the pressure-sensitive portion 11a of the diaphragm 11. The bridge circuit (not shown) including the strain gauges 19a to 19d provided on the pressure-sensitive portion 11a of the diaphragm 11 outputs a signal corresponding to a strain or deformation of the pressure-sensitive portion 11a and indicating the detection of the load applied.

As a larger load is applied, the elastic member 15 is compressed to shrink ad the activating member 14 is pressed downward. When a load reaching a certain value is applied later on, the abutment surface 14c that is also the bottom of the activating member 14 abuts the thick portion 11b of the diaphragm 11. As a larger load is applied, the abutment surface 14c will press the thick portion 11b. When the abutment surface 14c abuts the thick portion 11b, the elastic member 15 will not shrink any more and the driving member 17 will not be applied with any more load. Therefore, the pressure-sensitive portion 11a will not be applied with any larger load and the diaphragm 11 can be protected against any excessive or impact load.

Figure 6:
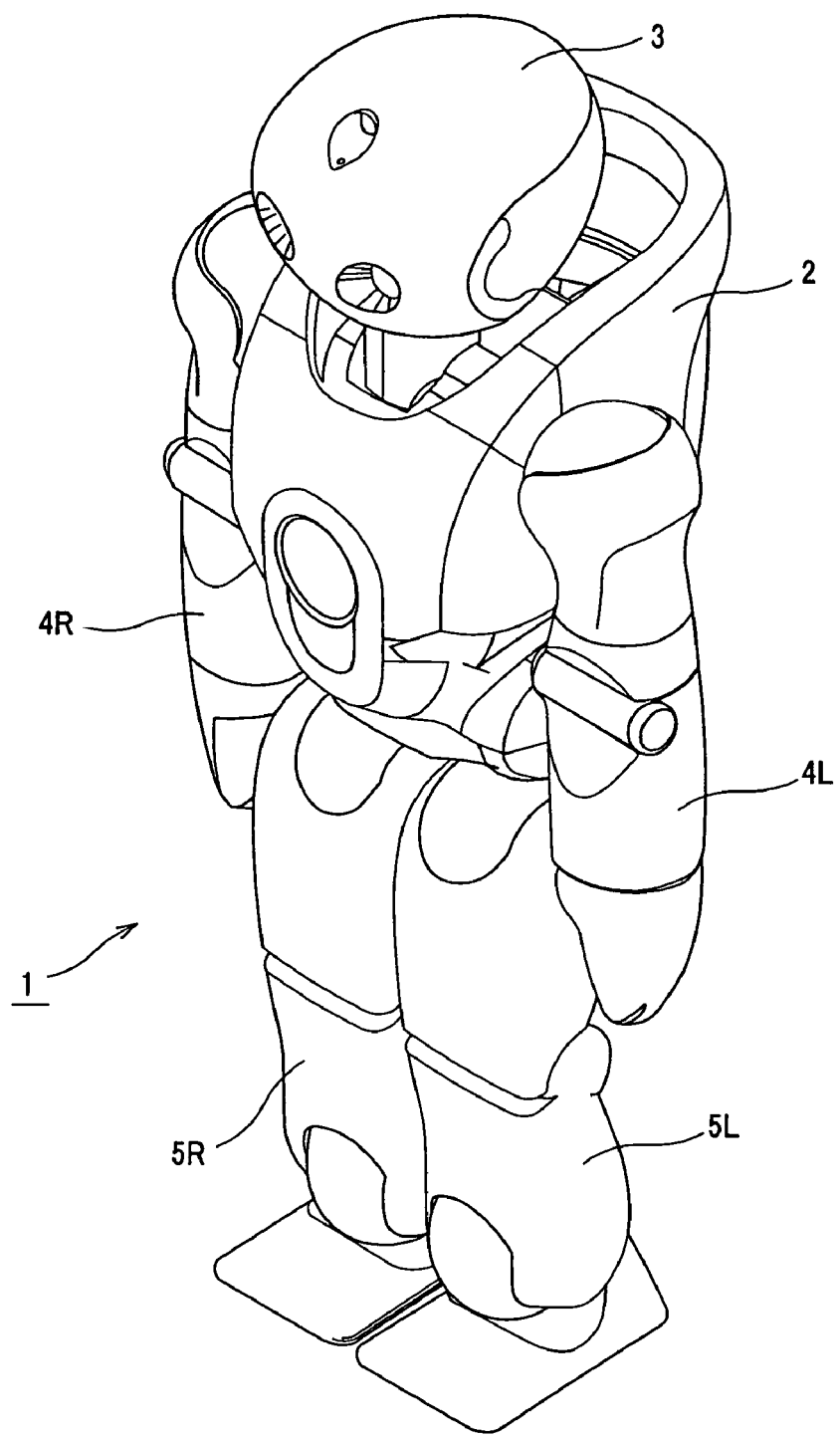
FIG. 6 is a perspective view of a robot apparatus according to the present invention.

Next, there will be explained a bipedal walking, humanoid robot apparatus having the aforementioned load sensor provided in the foot bottom and that detects, as an external force, a reaction applied when the foot bottom abuts the ground surface. First, the construction of the robot apparatus will be described:

The humanoid robot apparatus is a robot practically usable to support the human being in various daily situations such as residential environment etc. It can behave correspondingly to an internal state thereof (anger, sadness, joy, pleasure, etc.) and can simulate basic actions of the human being. FIG. 6 is a perspective view of the robot apparatus according to the present invention.

As shown in FIG. 6, the robot apparatus, generally indicated with a reference 1, includes a body unit 2, head unit 3 coupled in place to the body unit 2, two arm units, right and left, 4R and 4L, coupled in pace to the body unit 2, and two leg units, right and left, 5R and 5L, coupled in place to the body unit 2 (it should be noted that the "R" and "L" stand for "right" and "left", respectively, and this is also true hereunder).

Figure 7:
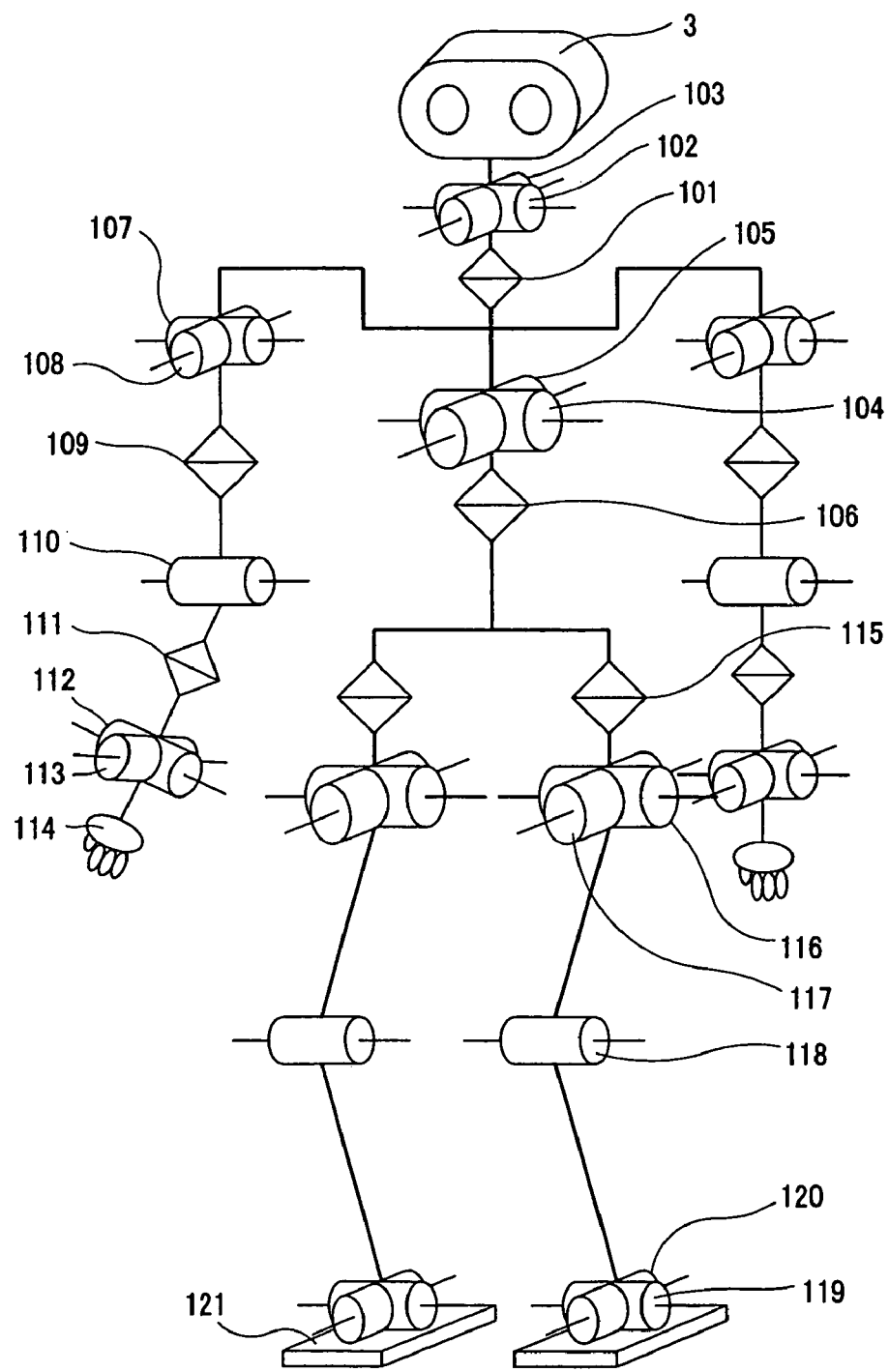
FIG. 7 schematically illustrates the degree of freedom of the joints in the robot apparatus in FIG. 6.

The robot apparatus 1 has degrees of freedom as schematically illustrated in FIG. 7. The head unit 3 has three degrees of freedom including a neck joint yaw axis 101, neck joint pitch axis 102 and a neck joint roll axis 103.

Also, each of the arm units 4R/L forming the upper limbs has a shoulder joint pitch axis 107, shoulder joint roll axis 108, upper arm yaw axis 109, elbow joint pitch shaft 110, lower arm yaw axis 111, wrist joint pitch axis 112, wrist joint roll axis 113 and a hand 114. The hand 114 is actually a multi-joint, multi-degrees-of-freedom structure including a plurality of fingers. Since any action of the hand 114 is less contributed to, or less influences, the control of the posture and walking of the robot apparatus 1, however, the hand 114 is assumed herein to have no degree of freedom. Therefore, each of the arm units 4R/L has seven degrees of freedom.

Also, the body unit 2 has three degrees of freedom including a body pitch axis 104, body roll axis 105 and a body yaw axis 106.

Further, each of the leg units 5R/L forming the lower limbs has a hip joint yaw axis 115, hip joint pitch axis 116, hip joint roll axis 117, knee joint pitch axis 118, ankle joint pitch axis 119, ankle joint roll axis 120 and a foot 121. It is assumed herein that the intersection between the hip joint pitch axis 116 and hip joint roll axis 117 defines the hip joint position of the robot apparatus 1. It should be noted that although the foot 121 of the human being is actually a structure including a sole having multiple joints and multiple degrees of freedom, the foot sole of the robot apparatus 1 is assumed herein to have no degree of freedom. Therefore, each of the leg units 5R/L has six degrees of freedom.

Namely, the robot 1 has a total of 32 degrees of freedom (=3+7×2+3+6×2). However, the entertainment robot apparatus 1 is not always limited to the 32 degrees of freedom. Depending upon the constraints in designing and manufacture and required specifications, the number of degrees of freedom, that is, joints, may of course be increased or decreased appropriately.

Each of the above degrees of freedom the aforementioned robot apparatus 1 has is actually implemented by an actuator. The actuator should desirably be small and lightweight to meet the requirements that the robot apparatus 1 should be formed to have a shape near the human being's natural shape with as less excessive bulging-out as possible and the posture of the bipedal walking robot as an unstable structure should be well controllable.

Note that for better understanding of the explanation of the foot 121, given below, a plane including a road surface (floor surface) under the bottom of the foot 121 will be referred to as "X-Y plane" and in the X-Y plane, the anterior-posterior direction of the robot apparatus 1 is taken as "X-axis" while the lateral direction is taken as "Y-axis" and the direction perpendicular to these X- and Y-axes is taken as "Z-axis" herein under.

Figure 8:
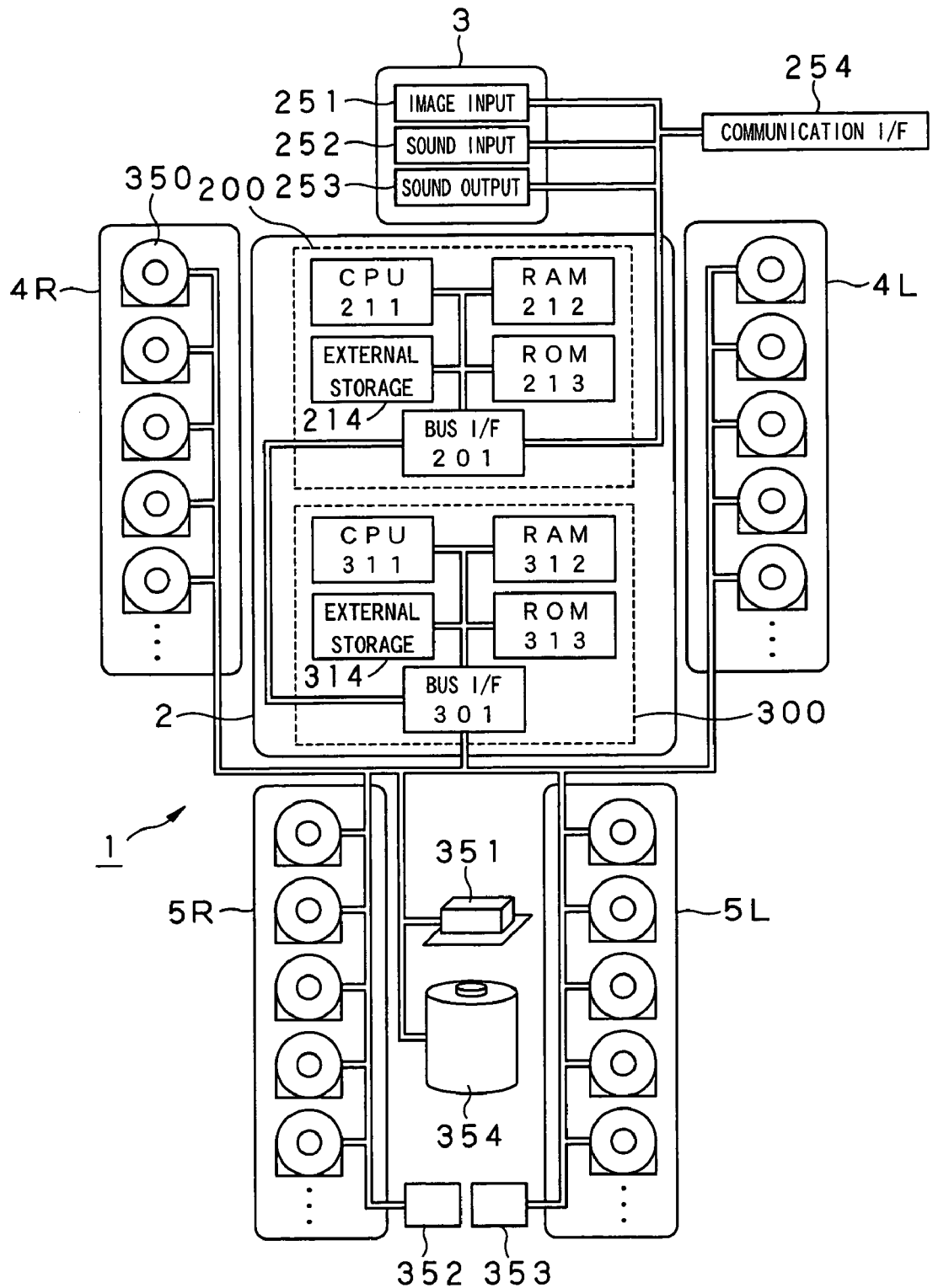
FIG. 8 schematically illustrates a control system used in the robot apparatus in FIG. 6.

In the robot apparatus, there is provided in the body unit 2, for example, a control system that controls operations of the entire robot apparatus. FIG. 8 schematically illustrates the control system included in the robot apparatus 1. As shown in FIG. 8, the control system includes a thought control module 200 that dynamically reacts with a user input or the like to make a control over an emotion judgment and expression, and an action control module 300 that controls the whole-body action coordination of the robot apparatus 1 such as driving of actuators 350.

The thought control module 200 is an independently driven information processor including a CPU (central processing unit) 211 that makes processes for the emotion judgment and expression, RAM (random-access memory) 212, ROM (read-only memory) 213, external storage unit (such as a hard disk drive) 214, etc. and that can make self-complete operations inside itself.

The above thought control module 200 determines a current emotion and will of the robot apparatus 1 according to external stimuli such as image data supplied from a video input unit 251, audio data supplied from an audio input unit 252, etc. The video input unit 251 includes a plurality of CCD (charge-coupled device) cameras, for example, and the audio input unit 252 includes a plurality of microphones, for example.

Also, the thought control module 200 issues commands to the action control module 300 for performing an action or behavior sequence, namely, actions of the four limbs, based on a decision-making.

On the other hand, the action control module 300 is an independently driven information processor including a CPU 311 that controls the whole-body action coordination of the robot apparatus 1, RAM 312, ROM (read-only memory) 313, external storage unit (such as a hard disk drive) 314, etc. and that can make self-complete operations inside itself. The external storage unit 314 can store a walking pattern on-line calculated, a target ZMP trajectory and other action plans, for example.

The above action control module 300 has connected thereto via a bus interface (I/F) 301, various units including actuators 350 to implement the degrees of freedom provided dispersedly through the whole body of the robot apparatus 1 shown in FIG. 7, a posture sensor 351 to determine a posture and inclination of the body unit 2, grounding check sensors 352 and 353 to detect when the right and left feet have the bottoms thereof off or on the floor surface, load sensor according to the present invention, provided in the sole 121 of the foot 121 and which will be described in detail later, a power control unit 354 that controls a power source such as a battery or the like, etc. The posture sensor 351 is formed from a combination of an acceleration sensor and gyro sensor. Each of the grounding check sensors 352 and 353 is formed from a combination of a proximity sensor or microswitch, for example.

The thought control module 200 and action control module 300 are built on a common platform, and are connected to each other via bus interfaces 201 and 301.

The action control module 300 controls the whole-body action coordination between the actuators 350 to implement an action command issued from the thought control module 200. More specifically, the CPU 311 takes, out of the external storage unit 314, an action pattern corresponding to an action command issued from the thought control module 200 or internally generates an action pattern. Then, the CPU 311 sets a foot action, ZMP trajectory, body action, upper-limb action, horizontal position and height of the waist, etc. and transfers commands for actions corresponding to these settings to the actuators 350.

Also, the CPU 311 can control the whole-body action coordination of the robot apparatus 1 adaptively by detecting the position and inclination of the body unit 2 of the robot apparatus 1 on the basis of signal outputs from the posture sensor 351, while detecting, based on signal outputs from the grounding check sensors 352 and 353, whether the leg unit 5R/L is idling or standing on the floor surface. Further, the CPU 311 controls the posture and action of the robot apparatus 1 so that the ZMP position is always directed toward the center of a stable ZMP area.

Also, the action control module 300 returns, to the thought control module 200, to what extent a will-based action determined by the thought control module 200 has been implemented, that is, the current state of operation. Thus, the robot apparatus 1 can autonomously acts by judging, based on a control program, its internal state and environmental condition.

Next, there will be described in detail a variant of the load sensor according to the present invention, provided at the sole of each foot of the above-mentioned robot apparatus 1. A plurality of the load sensors each as the variant according to the present invention is provided at the sole of each foot to detect, as an external force, a reaction applied when the foot sole contacts the ground surface. The load sensor is similar in basic construction to the load sensor having previously been described with reference to FIGS. 2 to 4 and can detect a load more stably.

Figure 9A:
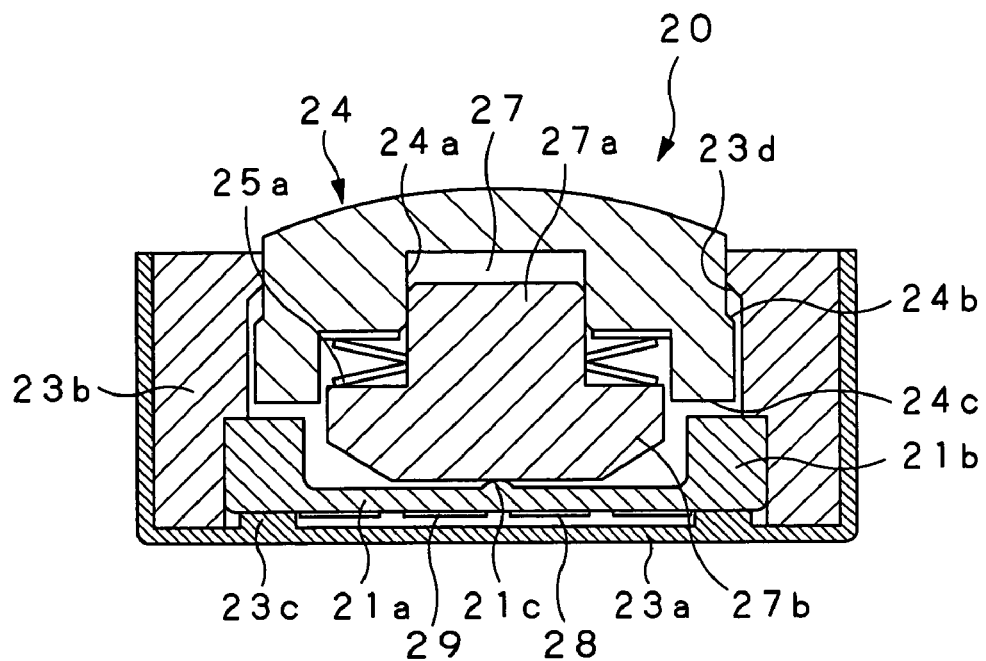
FIGS. 9A and 9B are longitudinal-sectional views of a variant of the load sensor in FIG. 2, showing the states, respectively, of the load sensor before and after an external force is applied.
Figure 9B:
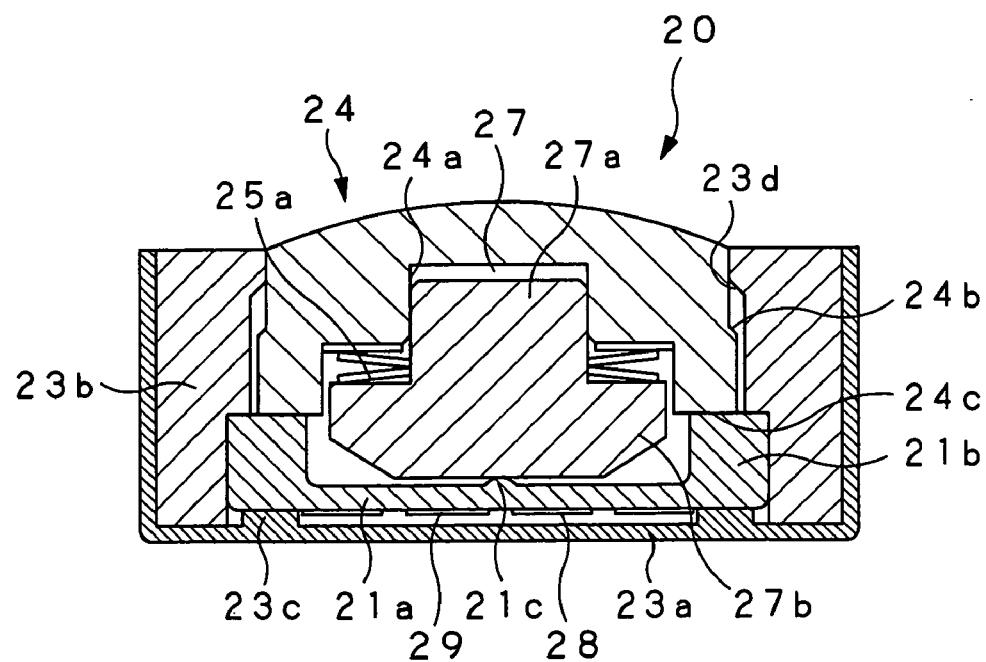
Figure 10:
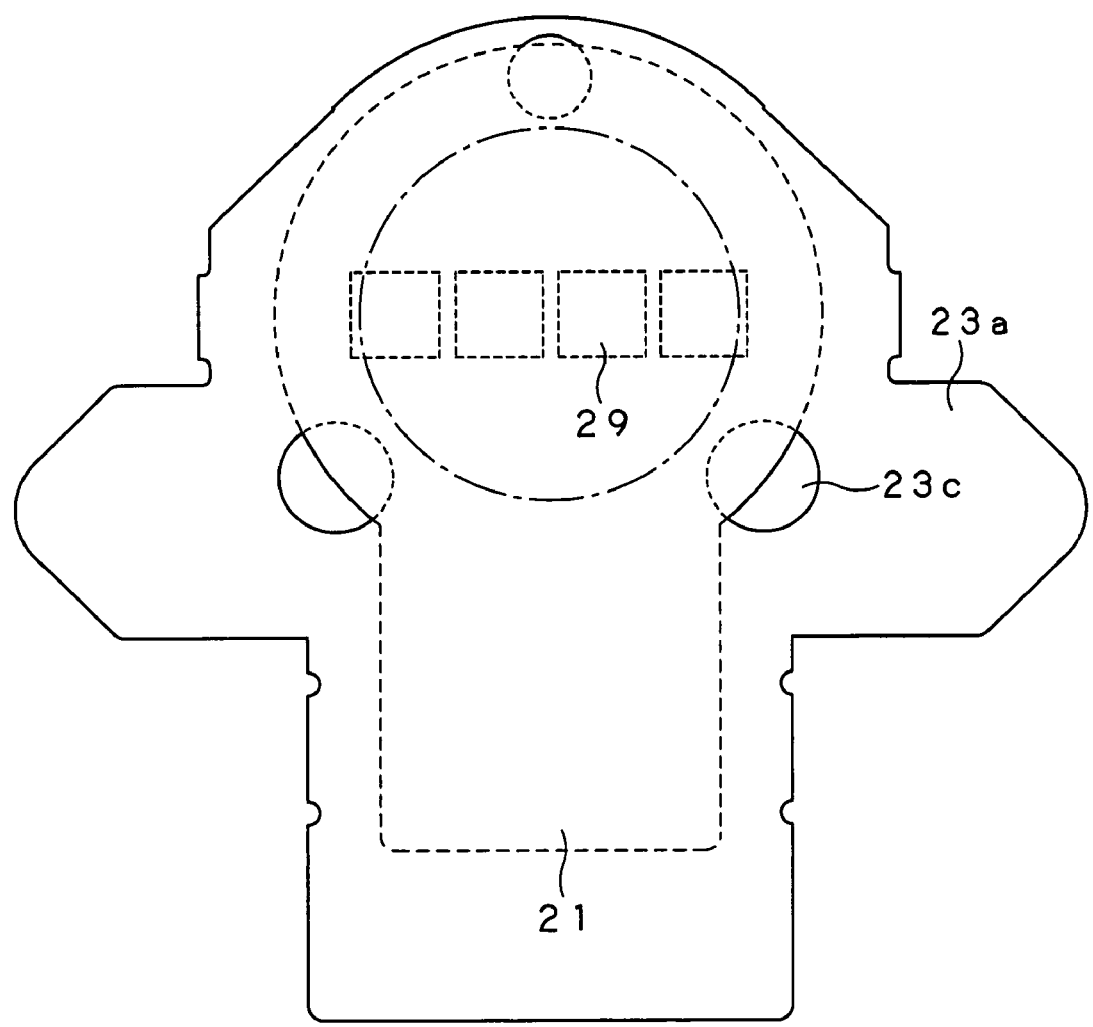
FIG. 10 is a plan view of a fixing plate and diaphragm of the load sensor variant in FIG. 9.
Figure 11:
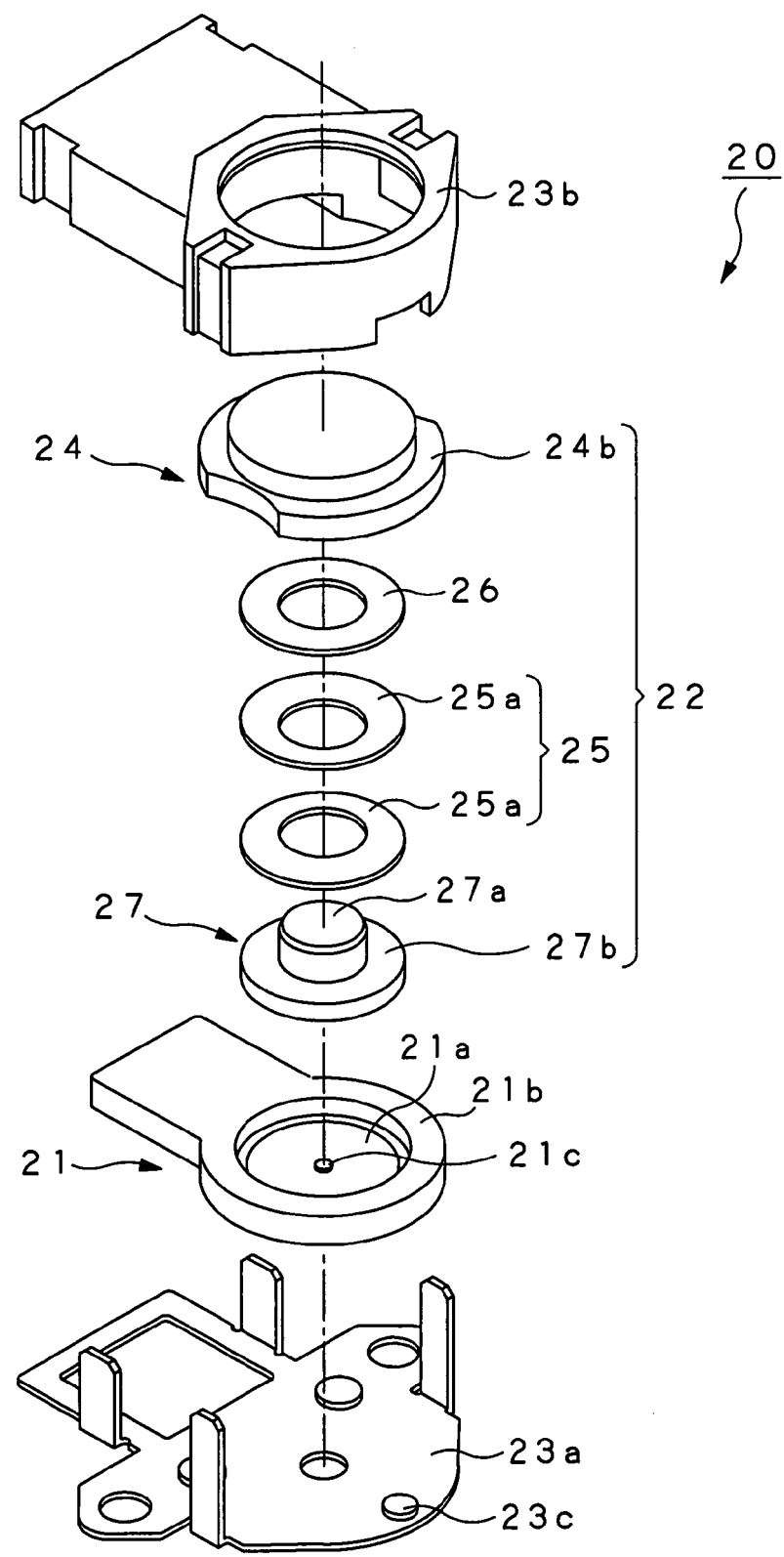
FIG. 11 is an exploded perspective view of the load sensor variant according to the present invention, showing the states of the load sensor before and after an external force is applied.

FIGS. 9A and 9B are longitudinal-sectional views of a variant of the load sensor in FIG. 2, showing the states, respectively, of the load sensor before and after an external force is applied, FIG. 10 is a plan view of a fixing plate portion and diaphragm, and FIG. 11 is an exploded perspective view of the load sensor shown in FIG. 9. The load sensor is generally indicated with a reference 20.

Note that in FIGS. 9 to 11, the load sensor 20 is illustrated on the assumption that the wrinkle portion of the leg unit 5R/L of the robot apparatus, to which the foot unit using the load sensor 20 is to be fixed, is directed upward. As shown, the load sensor 20 includes a diaphragm 21, for example, as the pressure detecting means having a pressure detecting function (pressure-sensitive portion), a pressing member 22 that is applied with an external force and presses the bottom of the pressure-sensitive portion of the diaphragm 21, and a case assembly 23 that supports and houses the diaphragm 21 and pressing member 22.

The diaphragm 21 is formed to have a disk-like shape. It is formed thick along the periphery thereof (indicated at a reference 21b) and has a central portion 21a thereof formed thinner than the thick peripheral portion 21b. Because of this reduced thickness, the central portion 21a of the diaphragm 21 works as a pressure sensor to detect a pressure from the pressing member 22. Different from the diaphragm 11 in the load sensor having been explained with reference to FIGS. 2 to 4, the diaphragm 21 in this load sensor 20 is concave at a pressure-receiving surface thereof that is pressed by a driving member 27 included in the pressing member 22. The concave portion forms the pressure sensor (pressure-sensitive portion 21a), and a side of the diaphragm 21 that contacts a fixing plate 23a of the case assembly 23 is included in a plane in which also the thick portion 21b lies. That is, it can be said that the diaphragm 21 is constructed from the portions of the diagram 11 laid upside down. A plurality of strain gauges 29 forming the pressure-sensitive portion 21a is formed at a side of the diaphragm 21 opposite to the side the driving member 27 contacts and where a projection 21c is formed to receive a pressure from the driving member 27 uniformly. The diaphragm 21 has formed on a side thereof that contacts the fixing plate 23a of the case assembly 23 an electric circuit formed on a resin or metal substrate to convert a pressure applied by the pressing member 22 into a predetermined electrical signal. For example, four strain gauges 29 may be laid in a rotational symmetry on the substrate and attached to the substrate to form a bridge circuit. Thus, a pressure is converted into an electrical signal, and the electrical signal is sent to the action control module 300 and the like in the aforementioned control system of the robot apparatus. The action control module 300 calculates ZMP etc. from the pressure based on the electrical signal.

In the load sensor 10 shown in FIG. 3, the strain gauges 19a to 19d are formed on the side of the pressure-sensitive portion 11a of the diaphragm 11 that is to contact the driving member 17, and a pattern (not shown) convex at the central portion thereof is formed by printing on the strain gauges 19a to 19d to provide a loading point. In the load sensor 20 shown in FIG. 9, however, such a pattern is provided on the strain gauges but the projection 21c is provided on the diaphragm 21 itself. The projection 21c has the surface thereof curved to receive the pressure from the driving member 27 uniformly. By constructing the load sensor for the driving member 27 not to press directly the strain gauges, it is possible to assure a more stable detection of an external force.

As above, the diaphragm 21 is formed thick along the periphery thereof to form the thick portion 21b. The thick portion 21b abuts at the bottom and side thereof the case assembly 23 to support the diaphragm 21. That is, the thick portion 21b of the diaphragm 21 abuts the activating member 24 as in the load sensor 10.

Also, for the fixing plate 23a of the case assembly 23 not to contact directly the pressure-sensitive portion 21a, the fixing plate 23a has formed in three places support portions 23c that support the thick portion 21b of the diaphragm 21.

The pressing member 22 conveys a pressure, as an external force, to the pressure-sensitive portion 21a, and has a stopper function of limiting the external force to make a pressure to the pressure-sensitive portion 21a of the diaphragm 21 to less than a predetermined threshold when a large external force is applied. The pressing member 22 includes the activating member 24 that is applied with an external force, the driving member 27 disposed in a cavity in the activating member 24 to press the pressure-sensitive portion 21a of the diaphragm 21, and an elastic member 25 that forces the activating member 24 to the driving member 27 in a direction in which the activating member 24 moves away from the diaphragm 21 and is displaced correspondingly (generally proportionally) to the magnitude of the external force applied to the activating member 24 to convey the external force to the driving member 27. When the load sensor 20 is applied with an external force via the pressing member 22, the activating member 24 conveys the external force to the driving member 27 via the elastic member 25 and the driving member 27 presses the pressure-sensitive portion 21b of the diaphragm 21. When a further external force is applied, the activating member 24 abuts the thick portion 21b of the diaphragm 21 to limit the external force.

The activating member 24 is formed from a resin or metal, for example, to have the general shape of a generally circular bottomed cylinder, when viewed from above. The bottom cylinder has a cavity wider than the driving member 27 and that can receive the driving member 27 nearly entirely. The cylinder is open opposite to the pressure-receiving surface of the diaphragm 21.

The activating member 24 has formed on the outer surface thereof near an abutment surface 24c thereof at which the end of the cylinder is open an engagement portion 24b that is to be engaged on an engagement portion 23d formed inside the case assembly 23. In a position where the pressure-receiving surface of the diaphragm 21 can be pressed, the engagement portion 24b is engaged on the engagement portion 23d of the case assembly 23. While no load is being applied, the abutment surface 24c of the cylindrical portion of the activating member 24 will not abut the thick portion 21b of the diaphragm 21 but a predetermined gap smaller than the critical displace occurs between the abutment surface 24c and diaphragm 21 as above. In case the load sensor 20 is provided on each of the feet of the robot apparatus with the fixing plate 23a being laid upside, for example, the activating member 24 is suspended under its own weight from the engagement portion 23d of the case assembly 23.

When an external force is applied from outside the bottom opposite to the open end, the inner side of the case assembly 23 is slid to the pressure-receiving surface of the diaphragm 21 until the abutment surface 24c of the activating member 24 abuts the thick portion 21b of he diaphragm 21. As a further external force is applied, the driving member 27 is pressed via the elastic member 25 until a predetermined load is attained. When the predetermined load is attained, the abutment surface 24c abuts the thick portion 21b of the diaphragm 21 and the inner side of the case assembly 23 is stopped from sliding. By constructing the load sensor 20 so that the external force is limited and a pressure larger than the predetermined threshold is not applied to the pressure-sensitive portion 21a as above, the pressure-sensitive portion 21a of the diaphragm 21 can be prevented from being broken by an excessive or impact load. The opening is larger in diameter than at least the pressure-sensitive portion 21a of the diaphragm 21, and thus even if an external force is applied, no pressure will be applied to the pressure-sensitive portion 21a.

In the bottom (inner surface) of the cavity formed in the activating member 24, there is formed a step (concavity) 24a smaller in diameter than the pressure-sensitive portion 21a of the diaphragm 21. The driving member 27 is fitted on the step 24a. Also, the exterior surface (outer surface) of the bottom of the activating member 24 is curved to a generally spherical shape so that a load applied as an external force can be conveyed uniformly to the driving member 27.

The driving member 27 is formed from a metallic material, for example. It is disposed in the cavity in the activating member 24. Thus, the pressing member 22 and activating member 24 form together a double structure. The driving member 27 is formed from a two-step cylinder including a shaft portion 27a fitted on the step 24a provided on the bottom inner surface of the activating member 24 and a flange portion 27b having a pressing portion thereof formed wide and which abuts the pressure-sensitive portion 21a of the diaphragm 21. That is, the flange portion 27b of the driving member 27 is shaped correspondingly to the inner step 24a of the activating member 24, and the driving member 27 is fitted in the activating member 24.

The shaft portion 27a of the driving member 27, fitted in the step portion 24a of the activating member 24, slides inside the step portion 24a in a direction perpendicular to the pressure-receiving surface of the diaphragm 21, and the flange portion 27b of the driving member 27 presses the pressure-receiving surface of the pressure-sensitive portion 21a. According to the present invention, the flange portion 27b of the driving member 27 is formed integrally with the shaft portion 27a, and the side of the flange portion 27b, that abuts and presses the pressure-receiving surface of the pressure-sensitive portion 21a, is generally identical in shape (when viewed from above) to the pressure-sensitive portion 21a of the diaphragm 21 and somewhat smaller in diameter than the pressure-sensitive portion 21a. Thus, the flange portion 27b can press the pressure-receiving surface of the pressure-sensitive portion 21a uniformly.

The elastic member 25 couples the activating member 24 and driving member 27 to each other. For example, it is formed from a belleville spring (coned disk spring) comprised of a plurality of disks forming together a cone and which is somehow smaller in outside diameter than the flange portion 27b of the driving member 27 and somehow larger in inside diameter than the shaft portion 27a of the driving member 27. It is mounted on the driving member 27 and forces the activating member 24 away from the diaphragm 21. The belleville spring is formed from elements 25a each made of a generally ring-like disk and that are stacked face to face one on the other obliquely from the inner to outer circumference. The belleville spring can have the height thereof limited in the direction of displacement to a relatively small one. Since the stroke of the belleville spring varies generally linearly starting with a small load even in this case, the activating member 24 and driving member 27 may not be spaced so much from each other, which thus leads to a thinner design of the load sensor 20.

The elastic member 25 is provided in such a manner that it is engaged on each of the step portion 24a of the activating member 24 and flange portion 27b of the driving member 27 and surrounds the shaft portion 27a formed narrow above the flange portion 27b of the driving member 27. When the activating member 24 is applied with an external force, the elastic member 25 conveys the external force to the driving member 27, and the driving member 27 presses the pressure-sensitive portion 21a of the diaphragm 21.

Also, a washer 26 is provided between the elastic member 25 and the step portion 24a of the activating member 24. If the washer 26 is not so provided, the activating member 24, if made of a resin, for example, will possibly be dented when applied locally with a load from the elastic member 25 formed from the belleville spring. On this account, the washer 26 is provided to disperse the applied load at the step portion 24a, to thereby prevent the activating member 24 from being so dented.

Note here that there should preferably be defined between the activating member 24 and the thick portion 21b of the diaphragm 21a gap that is smaller than the limit of the displacement the elastic member 25 makes in response to a load applied (critical displacement).

That is, if the elastic member 25 does not displace linearly in response to a load applied, the load detection is likely to vary due to a dimensional accuracy and change of ambient temperature. Namely, the accuracy of detection is considerably affected. Especially, if the load detection varies due to a dimensional accuracy and change of ambient temperature, although the load sensor is designed such that the activating member 24 will abut the diaphragm 21 when a load applied is within a predetermined range, the load under which the activating member 24 will abut the diaphragm 21 varies in some cases. As will be known from FIG. 5, the rubber or the like will not displace linearly in response to a load applied, will displace largely while the load applied is small, and will little displace when the load applied attains a certain magnitude. Thus, a slight change in character of the driving member 27 will lead to application of an extremely large load to the pressure-sensitive portion 21a of the diaphragm 21 in some cases. In such a case, the diaphragm 21 is likely to be broken. Therefore, by making the gap between the abutment surface 24c of the activating member 24, at which the latter abuts the diaphragm 21, smaller than the critical displacement of the elastic member 25, the displacement of the elastic member 25 can be limited to a range in which the elastic member 25 will displace linearly in response to a load applied. Thus, the driving member 27 can be made to abut the diaphragm 21 always under a constant load. That is, the load to the belleville spring can be limited to a smaller load than the critical load to the belleville spring, and the external force to the load sensor can be limited so that any pressure larger than a predetermined threshold will not be applied to the pressure-sensitive portion 21a of the diaphragm 21.

As will be seen from FIG. 5, if a rubber is used as the elastic member 25 instead of the belleville spring, the stroke will vary largely in response to a small load and the rubber hardness will vary due to the ambient temperature, so that such small changes will cause an error in the load setting and the activating member 24 will not be able to work stably. On the other hand, when the belleville spring that displaces linearly in response to a load applied, the stroke is generally proportional to the load before the critical load is reached, and the belleville spring will show less change in characteristic due to the ambient temperature. Namely, the belleville spring will assure a stable load detection and allow the abutment surface 24c of the activating member 24 to abut the diaphragm 21 under a constant load.

The load sensor constructed as above according to the present invention works when applied with a load as will be described herebelow:

When an external force is applied to the load sensor 20 while the activating member 24 is off the diaphragm 21 (as in FIG. 9A) with no external force yet applied, the abutment surface 24c of the activating member 24 of the pressing member 22 slides inside the case assembly 23 toward the diaphragm 21 until it abuts the thick portion 21b of the diaphragm 21.

More particularly, when an external force is applied to the outer surface of the activating member 24, projecting from the fixing plate 23b of the case assembly 23, the activating member 24 is forced toward the pressure-receiving surface of the diaphragm 21 and thus rises, while the elastic member 25 forces up the flange portion 27b of the driving member 27 toward the pressure-receiving surface of the diaphragm 21. Thus, the shaft portion 27a of the driving member 27 slides inside the step portion 24a of the activating member 24 toward the pressure-receiving surface of the diaphragm 21, while the flange portion 27b of the driving member 27 presses the pressure-receiving surface of the pressure-sensitive portion 21a of the diaphragm 21, as shown in FIG. 9B. The bridge circuit (not shown) including the strain gauges provided on the pressure-sensitive portion 21a of the diaphragm 21 outputs a signal corresponding to a strain or deformation of the pressure-sensitive portion 21a and indicating the detection of a load.

When a further external force is applied, the flange portion 27b of the driving member 27 presses the pressure-receiving surface of the diaphragm 21 until the abutment surface 24c of the activating member 24 abuts the thick portion 21b of the diaphragm 21 and is thus stopped from sliding. Once the abutment surface 24c abuts the diaphragm 21, any larger external force, if applied, will not cause the activating member 24 to press the driving member 27.

That is, while no external force is applied, the activating member 24 is caused by the force of the elastic member 25 to be off the diaphragm 21 with a gap between them. When an external force is applied, the activating member 24 abuts the thick portion 21b of the diaphragm 21 to limit the external force, whereby the force under which the flange portion 27b of the driving member 27 presses the pressure-receiving surface of the pressure-sensitive portion 21a of the diaphragm 21 is reduced to below the predetermined threshold. Thus, the diaphragm 21 is protected against any excessive load.

As above, once the external force is applied and the abutment surface 24c of the activating member 24 abuts the thick portion 21b of the diaphragm 21, the pressure-receiving surface of the pressure-sensitive portion 21a of the diaphragm 21 is protected by the activating member 24 that prevents the pressure-receiving surface of the diaphragm 21 from being pressed by the flange portion 27b of the driving member 27 with a larger force. That is, the activating member 24 works as a stopper to limit the external force so that a pressure larger than the predetermined threshold will not be applied to the pressure-receiving surface of the pressure-sensitive portion 21a of the diaphragm 21.

In the load sensor 20 according to the present invention, the diaphragm 21 and the pressing member 22 having the stopper function to limit the external force are housed in the case assembly 23 to form an integral structure of the load sensor 20. Thus, the pressure-sensitive portion 21a of the load sensor 20 will not be applied with a pressure larger than the predetermined threshold so that any excessively large pressure will not cause the diaphragm 21 to permanently deformed. Therefore, the accuracy of detection can be maintained, and if applied with any large pressure; the load sensor 20 can be prevented from being damaged. That is, when the abutment surface 24c of the activating member 24 abuts the thick portion 21b of the diaphragm 21, the elastic member 25 will not shrink any mode so that the driving member 27 will not be applied with any further load and hence will not apply any force larger than the predetermined one to the pressure-receiving surface of the diaphragm 21. Thus, since the pressure-sensitive portion 21a will not be applied with any larger load, the diaphragm 21 can be protected against any excessive or impact load.

Also, the pressing member 22 includes the elastic member 25 that displaces linearly in response to a load applied to couple the activating member 24 that is applied with an external force and the driving member 27 that presses the diaphragm 21 to each other. The stroke of the elastic member 25 is generally proportional to the load before the critical load is reached and is varied less in characteristic by any change of the ambient temperature. Thus, it is assured that the load sensor 20 can detect a load stably.

Therefore, since the diaphragm displacement varies linearly in response to a load applied, the load sensor provided on the foot sole of a robot apparatus can detect a reaction applied when it contacts the ground surface with a high stability and accuracy for a long term even if the ambient condition changes largely. Also, since the load sensor incorporates the stopper function, it is not necessary to provide any exterior stopper that prevents the load sensor from being applied with an excessive load caused by an impact or the like in case the foot sole is constructed to have a double structure, for example. Thus, the load sensor can be manufactured easily with a high productivity.

Figure 12:
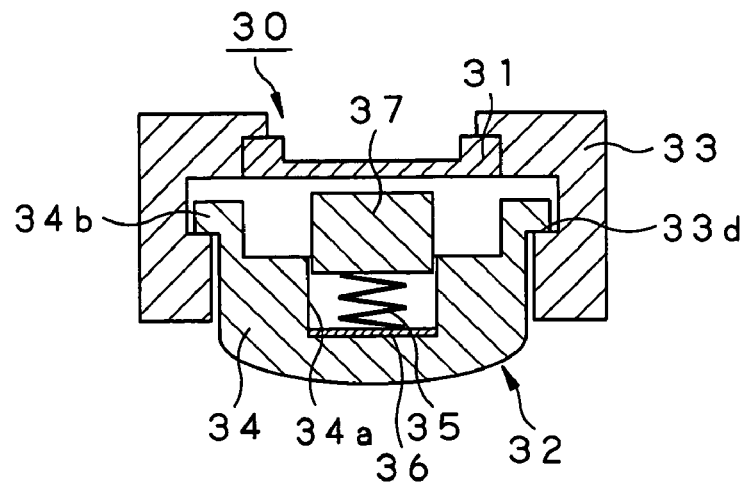
FIG. 12 is a longitudinal-sectional view of another variant of the load sensor according to the present invention.

FIG. 12 is a longitudinal-sectional view of another variant of the load sensor according to the present invention. The load sensor in which the activating member 24 abuts the thick portion 21a of the diaphragm 21 when applied with an external force has been described above with reference to FIGS. 9 to 11. The load sensor as another variant is generally indicated with a reference 30. According to the present invention, the load sensor 30 may be designed so that an activating member 34 abuts a case 33 as shown in FIG. 12. That is, a flange is formed at an portion where a diaphragm 31 is engaged on the case 33 in which the activating member 34 slides, and the flange abuts the activating member 34.

In the aforementioned first variant, the elastic member 25 to convey an external force applied to the activating member 24 to the driving member 27 uses a belleville spring that displaces linearly in response to a load applied. In this second variant, however, there is disposed an elastic member 35 such as a coil spring is disposed via a washer 36 inside a step portion 34a formed at the bottom of the bottomed cylindrical activating member 34 to convey an external force applied to the activating member 34 to a driving member 37. It should be noted that the coil spring should preferably be deformed linearly in response to a load applied. Of course, a belleville may be used as the elastic member 35 in this load sensor as shown in FIGS. 9 to 11.

Also in this variant, while no external force is being applied, an engagement portion 34b of the activating member 34 is engaged on an engagement portion 33d of the case 33 and the pressing member 34 is suspended from the engagement portion 33d under its own weight and thus the activating member 34 is held off the diaphragm 31. Also in this load sensor 30, a pressing member 32 having a stopper function to prevent a pressure larger than a predetermined threshold from being applied to the diaphragm 31 has a pressure sensor is formed integrally with the diaphragm 31. Also, since the activating member 34 and driving member 37 are coupled to each other by the elastic member 35 that displaces proportionally with the magnitude of external force, the load sensor can maintain its accuracy of detection force, and be prevented from being damaged by any excessive load applied.

An example of the foot to which the aforementioned load sensor is installed will be described herebelow:

The load sensor can be installed to each of the feet of the robot apparatus disclosed in the Specification and Drawings of the Japanese Patent Application No. 2002-073198 already filed by the Inventors of the present invention. Since the load sensor is provided under a preloaded condition between an instep and sole members of a conventional foot structure, each of the load sensors has to be calibrated (zero adjustment) with the load sensor being preloaded so that the preload value falls within a range of detection by each load sensor. This calibration is not easy. Such a calibration has to be done at each replacement of the sole member. The replacement includes many troublesome jobs. However, the foot of the robot apparatus according to the present invention needs no such preloading, which improves the accuracy of load detection and reduces the jobs for replacement of the sole member. In case the load sensor incorporating the stopper function according to the present invention is provided in the foot of the robot apparatus, no stopper has to be provided outside the load sensor, which contributes to an improved productivity.

Figure 13:
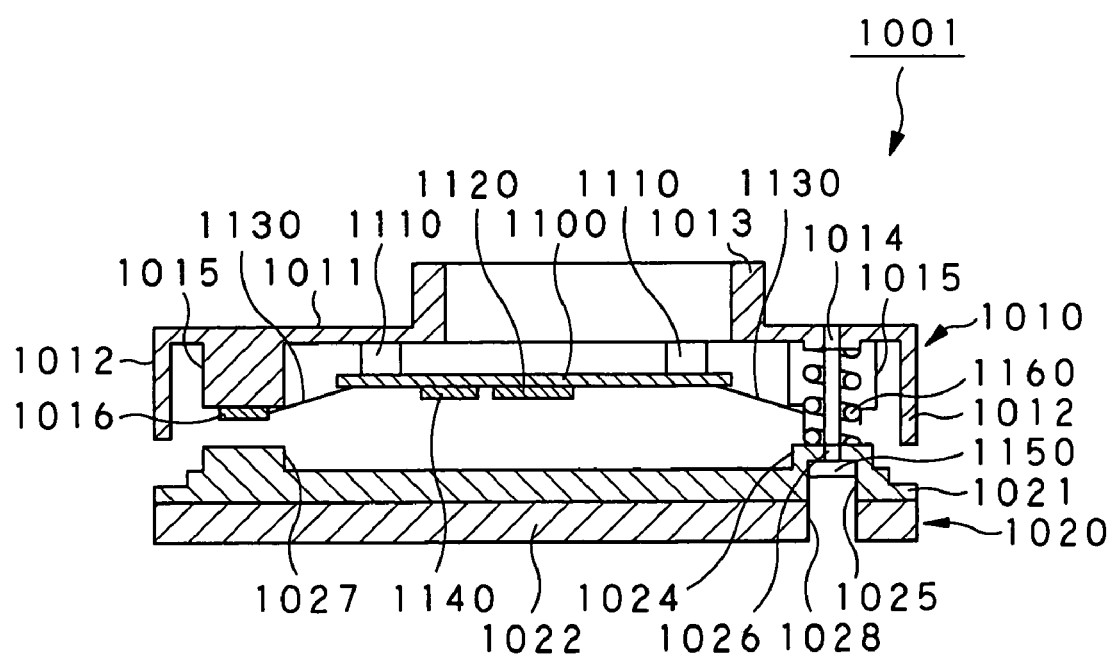
FIG. 13 is a sectional side view of a foot of a robot apparatus disclosed in the Specification and Drawings of the Japanese Patent Application No. 2002-073198.

FIG. 13 is a sectional side view of the foot of a robot apparatus disclosed in the Specification and Drawings of the Japanese Patent Application No. 2002-073198. As shown in FIG. 13, the foot, generally indicated with a reference 1001, has a double structure including an instep member 1010 coupled to the ankle of each of the right and left leg units 5R/L, and a sole member 1020 fixed to the instep member 1010 so that it can be guided into the instep member 1010 and which contacts directly the ground surface.

The instep member 1010 is formed to have a generally rectangular box open at the bottom thereof, and includes a generally rectangular top-plate portion 1011 and a side-plate portion 1012 formed integrally with the top-plate portion 1011 and projected from along the perimeter of the top-plate portion 1011. It should be noted that the side-plate portion 1012 may be provided in multiple places, not along the perimeter of the top-plate portion 1011. The top-plate portion 1011 has formed integrally on the top thereof a coupling 1013 for coupling to the ankle. The top-plate portion 1011 has formed herein screw holes (four in this embodiment) 1014 for installing the sole member 1020. The outer boundary of each side-plate portion 1012 is rounded circularly or curved smoothly.

The instep member 1010 can be fixed to the ankle with fixing means such as screws, for example. Alternatively, the instep member 1010 can be fixed to the ankle via a coupling mechanism (not shown), for example, to be removable. Nearly in the center of the bottom of the top-plate portion 1011 of the instep member 1010, an electric circuit board 1100 is installed by means of a plurality of support members 1110.

Figure 14:
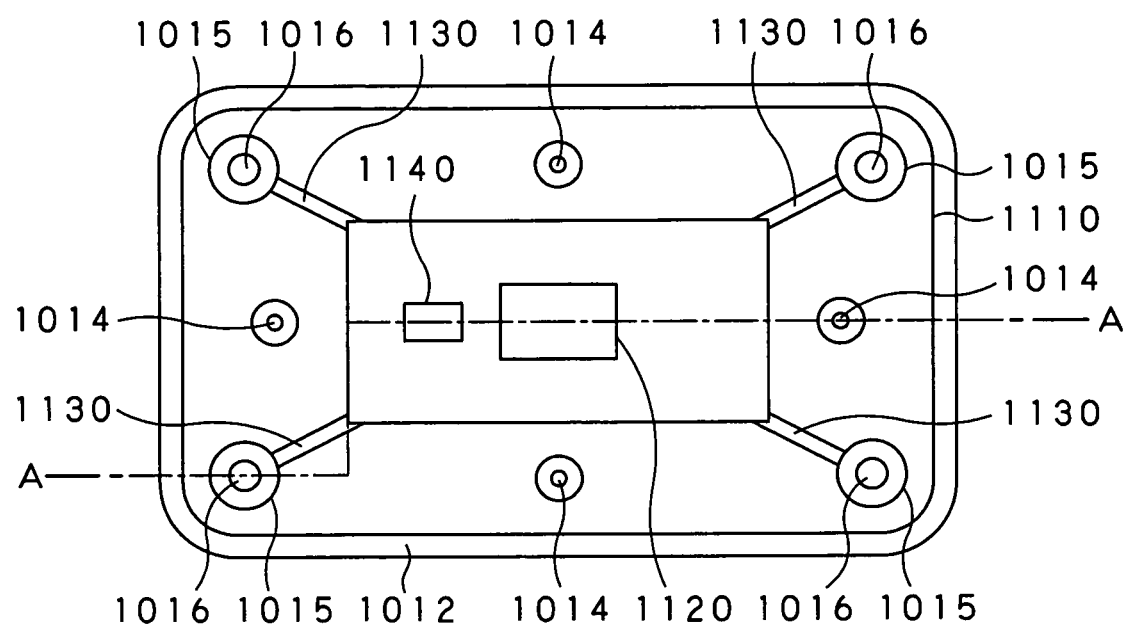
FIG. 14 is a plan view, from the grounding surface, of the instep member shown in FIG. 13.

FIG. 14 is a plan view, from the grounding side, of the instep member 1010 shown in FIG. 13. It should be noted that the sectional view in FIG. 13 shows a section taken along a dot-dash line A in FIG. 14. The top-plate portion 1011 of the instep member 1010 has formed integrally near each of four corners on the bottom thereof a convex seat 1015 for reception of the sensors, and there is disposed the end of each sensor seat 1015a load sensor 1016 having been described above with reference to FIGS. 9 to 11 and that detects a Z-axial pressure from which ZMP is to be calculated. Each of these load sensors 1016 is a load cell, for example. It includes a diaphragm formed from a metal or resin and four strain gauges. The four strain gauges are attached to the diaphragm to form together a bridge circuit. As having been described in the foregoing, the load sensor 1016 is of an integral structure including a case, diaphragm, and a pressing member that presses the diaphragm and incorporates a stopper function to make the pressure smaller than a predetermined threshold. The load sensor 1016 can detect an external force with a desired accuracy without having to be preloaded.

The electric circuit board 1100 has connected thereto a cable to supply a power to the diaphragm of the load sensor 1016 and transmit signals from the load sensor 1016 (will be referred to as "flexible cable" hereinafter) 1130. The load sensor 1016 and electric circuit board 1100 are connected to each other by the flexible cable 1130 for the reason that the load sensor 1016 should be prevented from being affected by any unnecessary or external force caused by a tension of the cable. Also, the electric circuit board 1100 has mounted thereon processing means (CPU, ROM, RAM, etc.) 1120, acceleration sensor 1140 to detect X- and Y-direction accelerations, etc. The output from the acceleration sensor 1140 is used to detect an inclination of the ground surface in relation to the gravity, stumbling due to an irregularity of the ground surface, etc.

The sole member 1020 is of an integral double structure having a generally rectangular grounding member 1022 bonded or with fixing members such as screws to the bottom of a generally rectangular sole body 1021.

The sole body 1021 is shaped in profile nearly similar to the opening of the side-plate portion 1012 of the instep member 1010. The sole body 1021 has formed on the top thereof upward-convex fixing projections 1024 corresponding to the screw holes 1014 formed in the top-plate portion 1011. The fixing projections 1024 and screw holes 1014 are used to install the sole member 1020 to the instep member 1010. The lower portion of each fixing projection 1024 has formed a circularly caved concavity 1025 in which a shoulder bolt 1150 threaded on the end portion thereof is introduced from below. Each of the fixing projections 1024 has formed in the center of the end thereof a through-hole 1026 penetrated vertically through the projection 1024. Also, in a position corresponding to each load sensor 1016 provided on the sensor seat 1015 of the top-plate portion 1011 of the instep member 1010, there is integrally formed a sensor pressing seat (sensor pressing member) 1027 that abuts the load sensor 1016 and is movable toward and away from the latter.

The grounding member 1022 is shaped generally identical to the sole body 1021, and has formed therein a through-hole 1028 corresponding to the concavity 1025 in the sole body 1021. The grounding member 1022 is formed from an elastic rubber sheet, for example, in order to lessen an impact applied when the foot 121 grounds the ground surface. The grounding member 1022 may be formed from a material selected from a metal, plastic and the like in addition to the rubber sheet, and may have the bottom (grounding surface) thereof formed to have recesses or an arch, for example, correspondingly to a condition of the ground surface. By appropriately changing or selecting the material of the grounding member 1022 and shape of the grounding surface, a variety of sole members 1020 can be formed correspondingly to various conditions of the ground surface.

The sole member 1020 can be installed to the instep member 1010 by introducing the shoulder bolt 1150 from below into the concavity 1025 and through-hole 1026 in the sole member 1020, fitting the coil spring 1160 onto the shoulder bolt 1150 and screwing the threaded end portion of the shoulder bolt 1150 into the screw hole 1014 in the top-plate portion 1011 until it will not go any more (to the step surface). It should be noted that a cylindrical buffer member (not shown) such as an elastic rubber or coil spring may be interposed between the top of the concavity 1025 and head of the shoulder bolt 1150.

When the robot apparatus having the aforementioned foot installed to the bottom of each of the leg units starts walking, the foot leaves the ground surface. While no force from the ground surface acts on the sole member 1020, the latter is separated from the instep member 1010 under the force of the coil spring 1160 to a stroke limit defined by the shoulder bolt 1150, and the load sensor 1016 installed to each sensor seat 1015 provided on the bottom of the top-plate portion 1011 is opposite to the end face of the sensor pressing seat 1027 provided on the sole body 1021 with a predetermined gap between them. The gap is set to 0.7 mm or so, for example.

When the foot contacts the ground surface and a force from the ground surface acts on the sole member 1020, the latter moves toward the instep member 1010 against the force of the coil spring 1160, the end face of the sensor pressing seat 1027 provided on the sole body 1021 abuts the load sensor 1016 installed to the sensor seat 1015 provided on the bottom of the top-plate portion 1011 and thus the pressure from the ground surface is conveyed to each of the load sensors 1016. The output from the load sensor 1016 is transmitted to the processing means 1120 on the electric circuit board 1100 via the cable 1130. After processed appropriately, the signal is transmitted from the action control module 300 of the control system in the robot apparatus body. In the action control module 300, ZMP is calculated from the signal. It should be noted that to lessen the burden of processing of the action control module 300 in the robot apparatus body, the signal may be transmitted to the action control module 300 in the robot apparatus body after ZMP is calculated in the processing means 1120 provided in the foot.

According to the present invention, the load sensor 1016 for ZMP detection has not to be preloaded. When the sole member 1020 is not in contact with the ground surface, the sensor pressing seat 1027 is separated from the load sensor 1016, namely, no preloading is done. When the sole member 1020 contacts the ground surface, the sensor pressing seat 1027 is made to abut the load sensor 1016. Thus, there is no necessary of adjusting the preloading. Also, since the coil spring 1160 that provides a force under which the sole member 1020 is separated from the instep member 1010 is interposed between the instep member 1010 and sole member 1020, it is possible to reduce the vibration of the sole member 1020 and thus the noise occurrence. Further, each of the load sensors 1016 can be calibrated without any external force being acting on the sole member 1020. Thus, the calibration can be done when the leg is idling during walking, which always assure an accurate detection.

Further, since the sole member 1020 can easily be replaced by removing the shoulder bolt 1150 and the latter can be tightened to the limit of screwing during reassembling of a new sole member 1020, the sole member 1020 can easily be set in a predetermined relation with the instep member 1010. Namely, the replacement of the sole member 1020 is extremely easy.

Moreover, since the sole member 1020 is off the load sensor 1016 while the leg is idling, even if the sole member 1020 is applied with any impact, the latter will be less conveyed to the load sensor 1016, whereby the accuracy of detection can be maintained and the load sensor is not easily damaged.

The load sensor in which the pressure sensor is pressed by the elastic member that displaces generally proportionally to the magnitude of a load applied and incorporates the stopper function can advantageously be used in the double-structure foot 1001 as will be described below:

As shown in FIG. 13, a predetermined gap is defined between the sole body 1021 and side-plate portion 1012, and when the robot apparatus makes the foot 1001 contacts the ground surface, an external force acts on the sole member 1020. At this time, if there is no stopper function is incorporated in the load sensor, the side-plate portion 1012 has to be used as an external stopper. In the load sensor, the moving range of the driving member is as narrow as several tens micrometers. Therefore, a stopper function is imparted to the side-plate portion 1012, the gap between the sole body 1021 and side-plate portion 1012 has to be adjusted to several tens micrometers, for example.

However, since the load sensor itself varies from one to another, it is difficult to keep constant the gap between the sole body 1021 and side-plate portion 1012 and hence it is necessary to adjust the gap between the sole body 1021 and side-plate portion 1012 correspondingly to each load sensor during assembly or the like. Also, the detection of ZMP in the robot apparatus needs a plurality of load sensors. Thus, if an external stopper is provided for all the load sensors, the manufacture thereof will be very troublesome.

According to the present invention, however, the load sensor 1016 incorporating the stopper function against a load applied makes it necessary to provide a stopper function outside the load sensor. Therefore, the gap between the sole body 1021 and side-plate portion 1012 has not be adjusted. As above, the stopper function and function of external force detection are integrated in the load sensor according to the present invention and thus the load sensor itself has the stopper function. Thus, it is not necessary to adjust the displacement intended for activation of the stopper and displacement of the load sensor as a detector, which contributes very much to an easier manufacture, installation, maintenance, etc.

As shown in FIGS. 13 and 14, since the side-plate portion 1012 works as a stopper, the load sensors can be prevented from being damaged. As mentioned above, however, since the load sensor according to the present invention incorporates the pressing member having the stopper function, the foot may not have any excessive strength for protection of the load sensor. For example, even if the load sensor is installed to a foot having not the side-plate portion 1012, it will not be broken or the pressure-sensitive portion will not be permanently deformed. Thus, the accuracy of detection can be maintained, the ZMP measuring function can be assured, and the foot sole can be designed more lightweight and compact, and manufactured with less costs.

Conventionally in a condition in which the foot sole is bent, the side-plate portion 1012, activated as a stopper provided outside the load sensor 1016, cannot inhibit the load sensor from being applied with an external force in some cases and thus the load sensor is damaged. According to the present invention, however, the integral type load sensor includes the case assembly and having housed in the case assembly the diaphragm, activating member having the stopper function and driving member that conveys an external force applied to the diaphragm to the activating member as having been described in the foregoing. Therefore, even if the foot is bent, the load sensor will not be broken and thus it will not lose the capability of high-accuracy load detection.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

Although the present invention has been described in the foregoing concerning the bipedal walking legged robot apparatus, the moving means for the robot apparatus is not limited to the quadruped walking and legged moving. Also, the load sensor according to the present invention has been explained concerning the installation thereof to the foot sole of a robot apparatus. However, it may be provided at other than the foot, for example, at the head, hand etc. Especially, even if these parts are of a double structure similar to that of the foot, no external stopper has to be provided. Therefore, the load sensor according to the present invention can be used as an external force detector not needing the positioning of such an external stopper and capable of detecting a large external force.

What is claimed is:

1. A robot apparatus having movable parts, the apparatus comprising:
   moving means for moving the robot apparatus; and
   a plurality of load sensors that detect, as an external force, a reaction applied when the moving means contacts a ground surface; and
   wherein at least one of the load sensors includes a pressure detecting means having a pressure-sensitive portion that converts a pressure into an electrical signal, a pressing member which is deformed correspondingly to the magnitude of the external force and presses the pressure detecting means, and
   a stopper function that limits the external force so that the pressure to the pressure-sensitive portion of the pressure detecting means is smaller than a predetermined threshold.

2. The apparatus as set forth in claim 1, wherein:
   the moving means is a leg of the robot apparatus; and
   the leg having more than one load sensor and each of which detects, as an external force, a reaction applied when the moving means contact a ground surface.

3. The apparatus as set forth in claim 1,
   wherein the pressing member including:
   an activating member that is applied with the external force;
   a driving member that presses the pressure-sensitive portion; and
   an elastic member that couples the driving and activating members to each other and displaces linearly in response to the external force.

4. The apparatus as set forth in claim 3, wherein:
   the pressure detecting means includes the pressure-sensitive portion and a peripheral portion; and when the pressing member is applied with an external force, the activating member conveys the external force to the driving member via the elastic member, and when a further external force is applied, the activating member abuts the peripheral portion of the pressure detecting means to limit the external force.

5. The apparatus as set forth in claim 4, wherein the peripheral portion of the pressure detecting means is thicker than the pressure-sensitive portion.

6. The apparatus as set forth in claim 4, wherein between the activating member and peripheral portion there is a gap smaller than a critical linear displacement the elastic member attains in response to the external force.

7. The apparatus as set forth in claim 3, wherein:

the pressing member has a double structure in which the driving member is disposed inside the activating member formed as a bottomed cylinder;

the activating member has a step portion that presses the driving member;

the driving member has a flange that abuts the pressure-sensitive portion; and the elastic member is formed from a bevel spring, engaged on each of the step portion and flange and couples the activating and driving members to each other.

8. The apparatus as set forth in claim 1, wherein each of the load sensors includes a case assembly that supports the pressure detecting means and pressing member.

9. The apparatus as set forth in claim 8, wherein:

the pressing member includes an activating member that is applied with the external force, a driving member that presses the pressure-sensitive portion and an elastic member that couples the driving and activating members to each other and displaces linearly in response to the external force; and when the pressing member is applied with an external force, the activating member conveys the external force to the driving member via the elastic member, and when a further external force is applied, the activating member abuts the peripheral portion of the pressure detecting means to limit the external force.

10. The apparatus as set forth in claim 2, further comprising:

an instep member provided in the end portion of the leg;

a sole member installed to the instep member to be freely movable; and at least one sensor is disposed in either the instep or sole member.

11. A load sensor including a plate-shaped pressure detecting means having a thin pressure-sensitive portion formed in the center thereof and strain gauges installed on the pressure-sensitive portion and a driving member mounted on the pressure-sensitive portion and which is pressed by a load-applying activating member, the load sensor comprising:

an elastic member to couple the driving member and activating member to each other and which displaces linearly in response to a load applied, the activating member pressing the driving member to the pressure-sensitive portion via the elastic member and being made to abut the pressure detecting means when a predetermined load is applied.

12. The load sensor as set forth in claim 11, wherein a thicker portion is formed around the pressure-sensitive portion and the activating members abuts the thick portion.

13. The load sensor as set forth in claim 11, wherein between the activating member and peripheral portion there is a gap smaller than a critical linear displacement the elastic member attains in response to the external force.

14. The load sensor as set forth in claim 11, wherein:

the driving member has a flange that abuts the pressure-sensitive portion; and the activating member has a step portion that presses the driving member, the elastic member being formed from a bevel spring, engaged on each of the step portion and flange and that couples the activating and driving members to each other.

* * * * *